US011809874B2

(12) United States Patent
Schuchman et al.

(10) Patent No.: US 11,809,874 B2
(45) Date of Patent: Nov. 7, 2023

(54) CONDITIONAL INSTRUCTIONS DISTRIBUTION AND EXECUTION ON PIPELINES HAVING DIFFERENT LATENCIES FOR MISPREDICTIONS

(71) Applicant: Apple Inc., Cupertino, CA (US)

(72) Inventors: Ethan R Schuchman, Saratoga, CA (US); Niket K Choudhary, Santa Clara, CA (US); Kulin N Kothari, Ellicott City, MD (US); Haoyan Jia, Ellicott City, MD (US); Ian D Kountanis, Santa Clara, CA (US); Douglas C Holman, San Jose, CA (US); Wei-Han Lien, Los Gatos, CA (US); Pruthivi Vuyyuru, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/590,722

(22) Filed: Feb. 1, 2022

(65) Prior Publication Data

US 2023/0244495 A1 Aug. 3, 2023

(51) Int. Cl.
*G06F 9/38* (2018.01)
*G06F 9/30* (2018.01)

(52) U.S. Cl.
CPC ........ *G06F 9/3844* (2013.01); *G06F 9/30058* (2013.01); *G06F 9/3836* (2013.01); *G06F 9/3861* (2013.01); *G06F 9/3885* (2013.01)

(58) Field of Classification Search
CPC .. G06F 9/3861; G06F 9/3836; G06F 9/30058; G06F 9/3885; G06F 9/3844; G06F 9/30072
See application file for complete search history.

(56) References Cited

U.S. PATENT DOCUMENTS

| | | | |
|---|---|---|---|
| 5,142,634 A | | 8/1992 | Fite et al. |
| 5,287,467 A | * | 2/1994 | Blaner ................. G06F 9/3832 712/240 |

(Continued)

FOREIGN PATENT DOCUMENTS

| | | |
|---|---|---|
| EP | 2063355 B1 | 9/2017 |
| JP | 6273718 B2 | 2/2018 |

OTHER PUBLICATIONS

A. Seznec, et. al., "A case for (partially) TAggged GEometric history length branch prediction", Retrieved from https://iilp.org/vol8/v8paper1.pdf, 2006 AI Access Foundation and Morgan Kaufmann Publishers, pp. 1-23.

(Continued)

*Primary Examiner* — Keith E Vicary
(74) *Attorney, Agent, or Firm* — Robert C. Kowert; Kowert, Hood, Munyon, Rankin & Goetzel, P.C.

(57) ABSTRACT

A processor may include an instruction distribution circuit and a plurality of execution pipelines. The instruction distribution circuit may distribute a conditional instruction to a first execution pipeline for execution when the conditional instruction is associated with a prediction of a high confidence level, or to a second execution pipeline for execution when the conditional instruction is associated with a prediction of a low confidence level. The second execution pipeline, not the first execution pipeline, may directly instruct the processor to obtain an instruction from a target address for execution, when the conditional instruction is mispredicted. Thus, when the conditional instruction is distributed to the first execution pipeline for execution and determined to be mispredicted, the first execution pipeline may cause the conditional instruction to be re-executed in the second execution pipeline to cause the instruction from the correct target address to be obtained for execution.

20 Claims, 12 Drawing Sheets

(56) References Cited

U.S. PATENT DOCUMENTS

| | | | |
|---|---|---|---|
| 5,644,779 A * | 7/1997 | Song | G06F 9/3842 |
| | | | 712/E9.05 |
| 5,870,579 A * | 2/1999 | Tan | G06F 9/3861 |
| | | | 712/217 |
| 5,920,710 A * | 7/1999 | Tan | G06F 9/3842 |
| | | | 712/216 |
| 6,157,998 A * | 12/2000 | Rupley, II | G06F 9/3861 |
| | | | 712/23 |
| 6,240,510 B1 * | 5/2001 | Yeh | G06F 9/30094 |
| | | | 712/E9.071 |
| 6,304,960 B1 * | 10/2001 | Yeh | G06F 9/30072 |
| | | | 712/236 |
| 8,521,996 B2 | 8/2013 | Henry et al. | |
| 10,235,173 B2 | 3/2019 | Rasale | |
| 11,169,807 B2 | 11/2021 | Bhat et al. | |
| 2001/0032309 A1 | 10/2001 | Henry et al. | |
| 2004/0003215 A1 * | 1/2004 | Krimer | G06F 9/3848 |
| | | | 712/E9.063 |
| 2004/0093485 A1 | 5/2004 | Nguyen et al. | |
| 2004/0210749 A1 | 10/2004 | Biles | |
| 2004/0225866 A1 | 11/2004 | Williamson | |
| 2008/0059779 A1 | 3/2008 | Davis | |
| 2008/0077781 A1 * | 3/2008 | Smith | G06F 9/3885 |
| | | | 712/239 |
| 2009/0249037 A1 * | 10/2009 | Webber | G06F 9/3885 |
| | | | 713/600 |
| 2010/0031010 A1 | 2/2010 | Moyer | |
| 2013/0067202 A1 | 3/2013 | Henry | |
| 2014/0156977 A1 * | 6/2014 | Dechene | G06F 9/3844 |
| | | | 712/239 |
| 2014/0156978 A1 | 6/2014 | Al-Otoom | |
| 2014/0195790 A1 * | 7/2014 | Merten | G06F 9/3844 |
| | | | 712/239 |
| 2016/0026470 A1 | 1/2016 | Manoukian | |
| 2017/0075689 A1 | 3/2017 | Branscome | |
| 2018/0101385 A1 | 4/2018 | Wang | |
| 2018/0173533 A1 | 6/2018 | Soundararajan et al. | |
| 2020/0167163 A1 | 5/2020 | Levenstein | |

OTHER PUBLICATIONS

A. Seznec, "A 256 Kbits L-TAGE branch predictor", Retrieved from https://www.irisa.fr/caps/people/seznec/L-TAGE.pdf, Journal of Instruction-Level Parallelism (JILP) Special Issue: The Second Championship Branch Prediction Competition (CBP-2) 9 (2007), 2007, pp. 1-6.

Biswa, "Lecture-10 (Branch Prediction) CS422—Spring 2018", Retrieved from https://www.cse.iitk.ac.in/users/biswap/CS422/L10-BP.pdf, 2018, pp. 1-16.

U.S. Appl. No. 17/590,719, filed Feb. 1, 2022, Kountanis, et al.

International Search Report and Written Opinion from PCT/US2023/011993, dated May 24, 2023, pp. 1-12.

* cited by examiner

Computer Accessible Storage Medium 800

SOC 804

FIG. 12

CONDITIONAL INSTRUCTIONS DISTRIBUTION AND EXECUTION ON PIPELINES HAVING DIFFERENT LATENCIES FOR MISPREDICTIONS

BACKGROUND

Technical Field

Embodiments described herein are related to a processor and, more particularly, to a processor including circuit(s) for predicting outcomes of conditional instructions and/or processing conditional instructions according to the predictions.

Description of the Related Art

Computing systems generally include one or more processors that serve as central processing units (CPUs). The CPUs execute the control software (e.g., an operating system) that controls operation of the various peripherals. The CPUs can also execute applications, which provide user functionality in the system. Sometimes, a processor may implement an instruction pipeline that includes multiple stages, where instructions are divided into a series of steps individually executed at the corresponding stages of the pipeline. As a result, the instruction pipeline can execute multiple instructions in parallel. To improve efficiency, the processor may further implement a conditional instruction prediction circuit (also called "conditional instruction predictor") that can predict the condition of conditional instructions. Based on the predictions, the processor may speculatively fetch instructions from target addresses for execution. However, if a conditional instruction is mispredicted, the speculative work has to be discarded, and the processor may have to re-fetch instructions from the correct target addresses for execution. Therefore, accuracy of the predictions of conditional instructions can play a critical role in performance of processors, and it thus becomes desirable to have techniques to improve the prediction accuracy. Moreover, with the increase of width and depth of execution pipelines, a processor may process multiple conditional instructions and/or mispredictions in a cycle. Therefore, it is also desirable to have techniques to improve efficiency of conditional instructions processing in processors.

BRIEF DESCRIPTION OF THE DRAWINGS

The following detailed description refers to the accompanying drawings, which are now briefly described.

FIG. 12 is a block diagram of a computer accessible storage medium.

Figure 1:
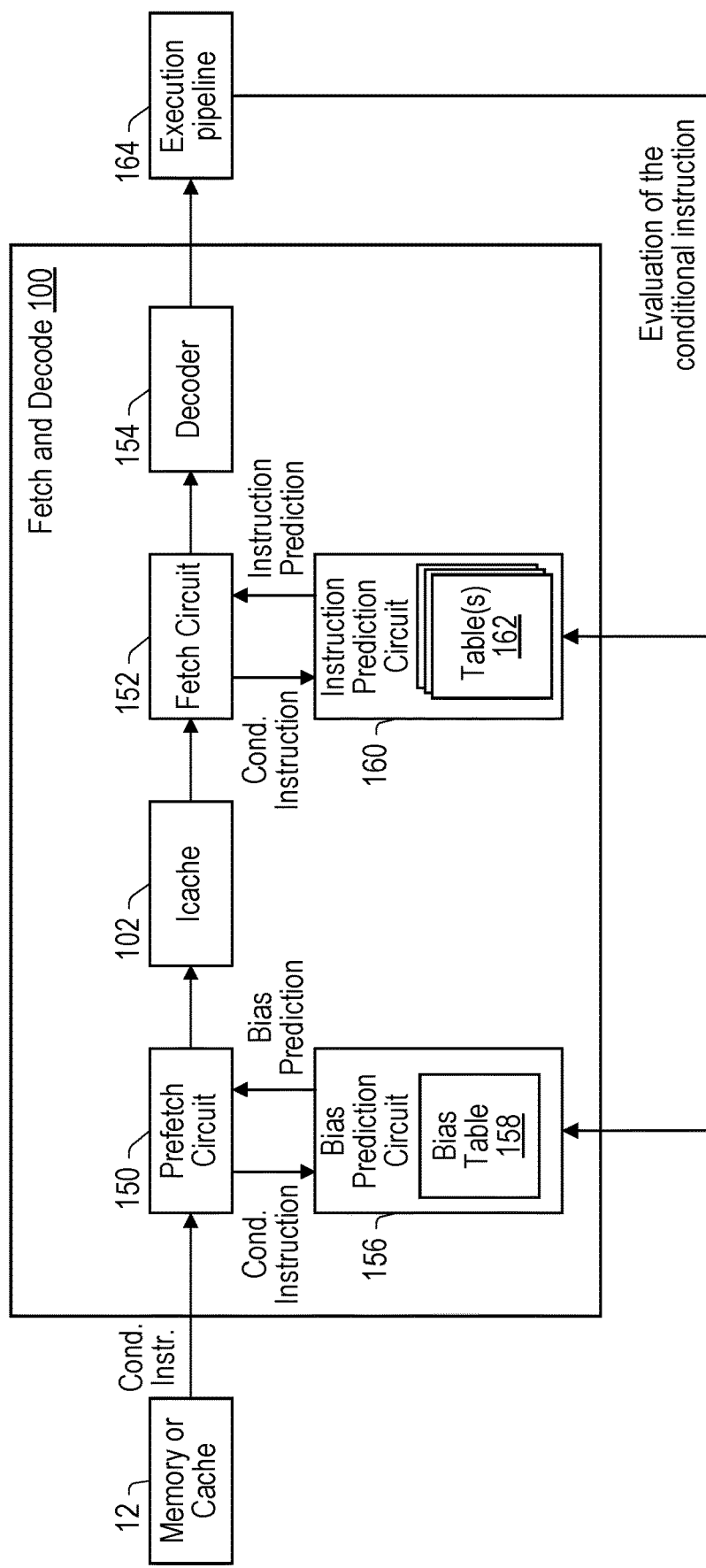
FIG. 1 is a block diagram of one embodiment of a portion of a processor including a bias prediction circuit and an instruction prediction circuit.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description.

DETAILED DESCRIPTION OF EMBODIMENTS

Turning now to FIG. 1, a block diagram of one embodiment of a portion of a processor 30 including a bias prediction circuit 156 and an instruction prediction circuit 160 is shown. In the illustrated embodiment, the bias prediction circuit 156 and the instruction prediction circuit 160 may be implemented as part of a fetch and decode circuit 100 of the processor 30. Alternatively, in some other embodiments, the bias prediction circuit 156 and/or the instruction prediction circuit 160 may be implemented as component(s) separate from the fetch and decode circuit 100.

As indicated in FIG. 1, in the illustrated embodiment, the fetch and decode circuit 100 may implement a pipeline having several stages. For example, to process an instruction, the fetch and decode circuit 100 may first use a prefetch circuit 150 to load the instruction from memory or cache 12 to an instruction cache (Icache) 102 (hereinafter named the "prefetch" stage). Next, the instruction may be fetched by a fetch circuit 152 from the Icache 102 to a decoder 154 for decoding (hereinafter named the "fetch" stage). The decoder 154 may decode the instruction, convert it to operation(s) and/or micro-operation(s) (hereinafter called the "decoding" stage), and send the operation(s) and/or micro-operation(s) to an execution pipeline 164 for execution. Note that sometimes an instruction may already exist in the Icache 102, e.g., when the Icache 102 stores an instruction in Icache 102 that was previously loaded from memory or cache 12. In that case, the prefetch stage may be avoided, and the instruction may be fetched directly from the Icache 102 for execution. In the illustrated embodiment, the execution pipeline 164 may be implemented using an execution unit 112 (e.g., an integer, floating point, and/or vector execution unit) and associated reservation station 110 that are described in FIG. 9. Also, for purposes of illustration, FIG. 1 may not necessarily depict all the components of the processor 30. For example, sometimes the fetch and decode circuit 100 may not necessarily be directly coupled to the execution pipeline 112. Instead, there may be one or more other components in-between. For example, sometimes the processor 30 may include a map-dispatch-rename (MDR) unit 106 between the fetch and decode circuit 100 and the execution pipeline 112, which may map the operation(s) and/or micro-operation(s) to speculative resources (e.g., physical registers) to permit out-of-order and/or speculative execution, and may dispatch the operation(s) and/or micro-operation(s) to the reservation stations 110.

Execution of a code including a conditional instruction may depend on the condition of the conditional instruction. When the condition of the conditional instruction is true, a first instruction from a first target address may be loaded, fetched and executed. Conversely, when the condition of the conditional instruction is false, a second instruction from a second target address may be loaded, fetched and executed. For purposes of illustration, below is an example code including a conditional instruction:

```
If (a > b)      // the conditional instruction
{
x = 1;          // the instruction to be executed when the condition is true
}
else
{
x = 2;          // the instruction to be executed when the condition is false
}
```

In this example, the conditional instruction simply involves a comparison between the values of two variable "a" and "b." If the condition of the conditional instruction is true (i.e., the value of "a" is greater than the value of "b"), a first instruction from a first target address may be executed to assign the value of the variable "x" to 1. Conversely, if the condition of the conditional instruction is false (i.e., the value of "a" is less than or equal to the value of "b"), a second instruction from a second target address may be executed to assign the value of the variable "x" to 2.

In the illustrated embodiment, the fetch and decode circuit 100 may speculatively process conditional instructions. For example, the fetch and decode circuit 100 may predict the condition of a conditional instruction prior to the (actual) execution of the conditional instruction, and based on the prediction speculatively determine a target address based on which a subsequent instruction may be obtained for execution. As described above, the target address may reside in memory or cache 12, or Icache 102. Further, as illustrated in the foregoing example, the subsequent instruction may or may not be immediately next to the conditional instruction. To improve efficiency, the fetch and decode circuit 100 may further use the bias prediction circuit 156 with a bias table 158 to provide a bias prediction whether the conditional instruction is biased true or biased false. When a conditional instruction is predicted to be biased true or biased false, the fetch and decode circuit 100 may use the bias prediction from the bias prediction circuit 156 to process the conditional instruction. Conversely, when the conditional instruction is predicted not to be biased true or biased false, the fetch and decode circuit 100 may use instruction prediction circuit 160 with one or more table(s) 162 to provide another prediction, such as an instruction prediction, whether the condition of the conditional instruction is true or false, and use the instruction prediction to speculatively process the conditional instruction.

In the illustrated example, the bias prediction circuit 156 and instruction prediction circuit 160 may perform respective predictions at different stages of the processing of a conditional instruction in the fetch and decode circuit 100. For example, in the illustrated embodiment, the bias prediction circuit may provide the bias prediction for a conditional instruction at the prefetch stage when the conditional instruction is loaded from the memory or cache 12 to the Icache 102. By comparison, in the illustrated embodiment, the instruction prediction circuit 160 may provide the instruction prediction at a relatively "later" stage, such as the fetch stage when the conditional instruction is fetched from the Icache 102 to the decoder 154. Note that the above is provided only as an example for purposes of illustration. In some embodiments, the bias prediction circuit 156 and instruction prediction circuit 160 may provide their respective predictions around the same time, e.g., both at the same stage such as the prefetch stage, the fetch stage, etc.

Sometimes, when a conditional instruction is predicted to be biased true or biased false, the fetch and decode circuit 100 may simply cause the conditional instruction to "bypass" the instruction prediction circuit 160. In other words, the instruction prediction circuit 160 may not necessarily provide the second prediction such as the instruction prediction. Alternatively, sometimes the fetch and decode circuit 100 may still use the instruction prediction circuit 160 to provide the instruction prediction. However, when the conditional instruction is predicted to be biased true or biased false, the fetch and decode circuit 100 may ignore the instruction prediction from the instruction prediction circuit 160, and instead use the bias prediction from the bias prediction circuit 156 to speculatively process the conditional instruction as described above.

In the illustrated embodiment, the bias prediction from the bias prediction circuit 156 and the instruction prediction from the instruction prediction circuit 160 may indicate different properties of a conditional instruction. Also, they may be generated in different ways, as described in FIGS. 2-3. In the illustrated embodiment, the bias prediction from the bias prediction circuit 156 may indicate whether or not a conditional instruction is predicted to be biased (e.g., biased true or biased false). A conditional instruction being biased refers to the scenario where the condition of a conditional instruction is always true or false. For example, if the condition is always true, the condition of the conditional instruction is considered biased true. Conversely, if it is always false, the condition is considered biased false. Referring back to the bias prediction, when the condition of a conditional instruction is predicted to be biased true (or biased false), it means that the condition of the conditional instruction is predicted to be always true (or always false), and accordingly the conditional instruction is presumed to behave always one way (or another). By comparison, the instruction prediction from the instruction prediction circuit 160 may indicate whether the condition of a conditional instruction is predicted to be true or false. However, unlike the bias prediction, the instruction prediction may not necessarily indicate whether the conditional instruction is biased true or biased false, or in other words, always true or always false.

Note that the bias prediction and the instruction prediction are both merely predictions. Thus, either of them may be erroneous. In the illustrated embodiment, the quality of the predictions may be determined after the conditional instruction is executed, e.g., by the execution pipeline 164. Consider the foregoing example code, once values of the operands (e.g., the variables "a" and "b") are obtained, and the operator (e.g., the comparator ">") is applied to the operands, the processor 30 may be able to determine whether the condition of the conditional instruction is actually true or false, and accordingly evaluate whether the bias prediction and/or the instruction prediction is correct. In the illustrated embodiment, the bias prediction circuit 156 and/or the instruction prediction circuit 160 may be updated based on the evaluation of the conditional instruction. For example, when the bias prediction and/or the instruction prediction is a misprediction, the bias table 158 of the bias prediction circuit 156 and/or the table(s) 162 of the instruction prediction circuit 160 may get updated.

When a misprediction occurs, the processor 30 may have to discard the speculative work, and get another instruction from the correct target address for execution. For example, the execution pipeline 164 may discard the instruction in the execution pipe that was speculatively fetched, and the fetch and decode circuit 100 may have to redirect the prefetch circuit 150 and/or the fetch circuit 152 to obtain the instruction from the correct target address for execution (also called re-fetch). Sometimes, this can cause additional delays to operations of the processor 30. However, in practice, most conditional instructions may be biased instructions. Thus, even with the above penalty caused by mispredictions, use of the additional bias prediction circuit may still increase the overall efficiency of the processor 30. Especially, if the processor 30 allows predictively-biased conditional instructions to "bypass" the instruction prediction circuit 160, this may greatly reduce the overall workload and improve efficiency of the processor 30.

Figure 2A:
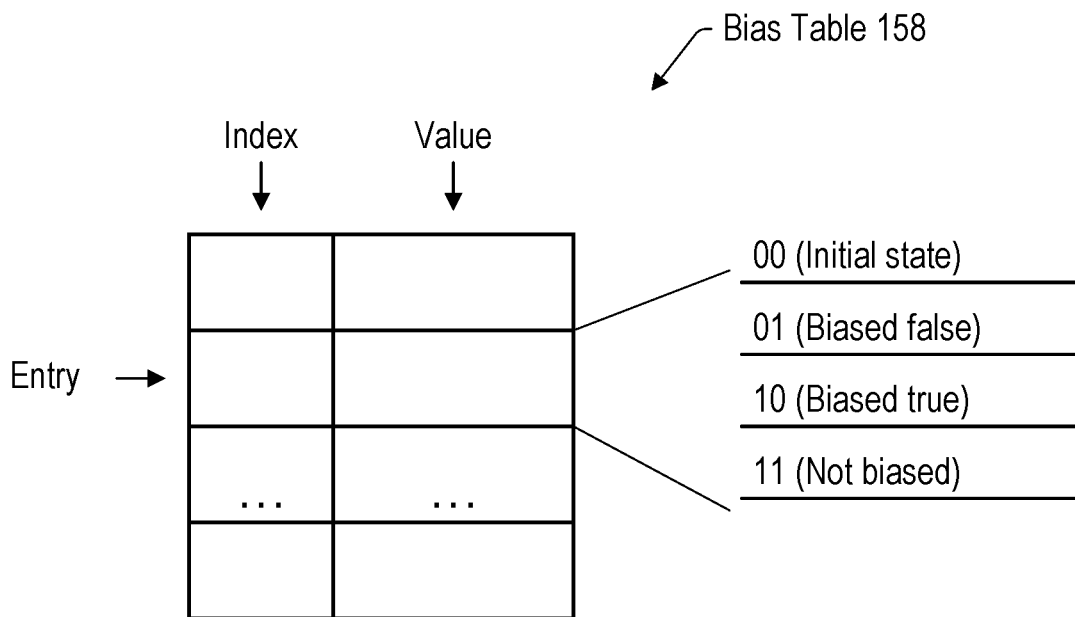
FIG. 2A shows one embodiment of a bias table of a bias prediction circuit.

In the illustrated embodiment, the bias prediction circuit 156 may use a bias table 158 to provide the bias prediction for a conditional instruction. FIG. 2A shows an example bias table 158. In the figure, the bias table 158 may be organized into one or more entries, where each entry may be identified by a corresponding index and include a corresponding value. In the illustrated embodiment, the indices of the bias table 158 may be associated with addresses of conditional instructions. For example, the indices may be created by hashing the addresses of conditional instructions using a hash function. In the context of hashing, the addresses of the conditional instructions may be considered the "keys," and the values in the entries may be considered the "values," two of which may be associated with each other via the indices (and the hash function). Accordingly, for a given conditional instruction, the bias prediction circuit 156 may identify a value in a corresponding entry of the bias table 158 (e.g., the "value") based on the address of the conditional instruction (e.g., the "key"), and then provide a bias prediction for the conditional instruction based on the identified value in the bias table 158. For example, when the bias prediction circuit 156 receives a conditional instruction, the bias prediction circuit 156 may obtain the address of the conditional instruction, e.g., from the program counter (PC). The bias prediction circuit 156 may determine an index based on the address of the conditional instruction, e.g., using the hash function. The bias prediction circuit 156 may then use the index to search the bias table 158 to find an entry matching the index, identify the value in the entry, and use the value to determine the bias prediction for the conditional instruction. Note that sometimes the indices of the bias table 158 may be subject to hashing collision, e.g., a phenomenon where different addresses of different conditional instructions may be hashed into an identical index. In other words, different keys may correspond to the same value in the bias table 158. Sometimes, the hashing collision may cause mispredictions for conditional instructions.

In FIG. 2A, in the illustrated embodiment, the values in the bias table 158 may be 2-bit values indicating different predictions as to the biasness of a conditional instruction. For example, a value "00" may indicate that no conditional instruction corresponding to the entry of this value has been encountered before by the bias prediction circuit 156. A value "01" may indicate that the condition of a conditional instruction is biased false. A value "10" may indicate that the condition of a conditional instruction is biased true. And a value "11" may indicate that the condition of a conditional instruction is not biased (e.g., neither biased true nor biased false), albeit the conditional instruction corresponding to the entry of this value has been encountered before by the bias prediction circuit 156. Note that the bias table 158 in FIG. 2A is provided only as an example for purposes of illustration. In some embodiments, the values in the bias table 158 may have less or more bits. For example, sometimes the values may have more than two bits to provide a certain level of hysteresis.

In the illustrated embodiment, the instruction prediction circuit 160 may also use one or more table(s) 162 to predict the instruction prediction of a conditional instruction. However, unlike the bias prediction circuit 156, at least some of the table(s) 162 may be heavily associated with the previous prediction history (e.g., by the instruction prediction circuit 160) and/or evaluation history of conditional instructions. Further, sometimes the history may involve history of the specific conditional instruction, but also history of other conditional instructions in the same code. For example, sometimes the instruction prediction circuit 162 may be a TAgged GEometric length predictor (also called the TAGE predictor) that includes a basic predictor $T_0$ and a set of (partially) tagged predictors $T_i$ ($1 \leq i \leq M$). The basic predictor $T_0$ may use a basic table 162(0) to provide a basic prediction. In the illustrated embodiment, the indices of the basic table 162(0) may be generated by hashing the addresses of conditional instructions. By comparison, the tagged predictors $T_i$ ($1 \leq i \leq M$) may each have a table 162($i$) ($1 \leq i \leq M$), whose indices may be created by hashing (a) the addresses of conditional instructions and (b) the previous prediction and/or evaluation history of the conditional instructions. The history may be considered a geometric series. For example, the addresses of the conditional instructions may be concatenated with the history, and then the two may be hashed together to generate the indices. The tables 162($i$) of different tagged predictors $T_i$ ($1 \leq i \leq M$) may be associated with different history lengths. For example, the higher the order of a tagged predictor (e.g., the larger the i), the longer the history may be used to generate the indices for the table 162($i$) of the tagged predictor $T_i$ ($1 \leq i \leq M$). Accordingly, the tagged predictor $T_i$ ($1 \leq i \leq M$) may use their respective tables 162($i$) ($1 \leq i \leq M$) to provide a respective prediction for a conditional instruction. Sometimes, the hashing functions for the bias table 158 of the bias prediction circuit 156 and the basic table 162(0) of the instruction prediction circuit 160 may be different. Further, sometimes the hashing functions for the different tables 162($i$) of the different predictors $T_i$ ($0 \leq i \leq M$) may be also different. In addition, the hashing functions described above may be implemented based on any appropriate hashing functions, including exclusive or (or XOR) operations.

In the illustrated embodiment, for a given conditional instruction, to provide an instruction prediction, the instruction prediction circuit 160 may determine the indices for the respective (M+1) predictors (0≤i≤M) based on the address of the conditional instruction and history (for tagged predictors only), identify a matching predictor with the longest history (e.g., with the highest order), and use the prediction from the matched predictor as the (final) instruction prediction for the conditional instruction. According to the above description, it can be seen that the instruction prediction circuit 160 may be more complicated than the bias prediction circuit 156 and thus consume more time to make a prediction. Thus, use of the additional bias prediction circuit 156 to allow predictively-biased conditional instructions to "bypass" the instruction prediction circuit 160 may reduce the overall workload and improve efficiency of the processor 30.

Figure 2B:
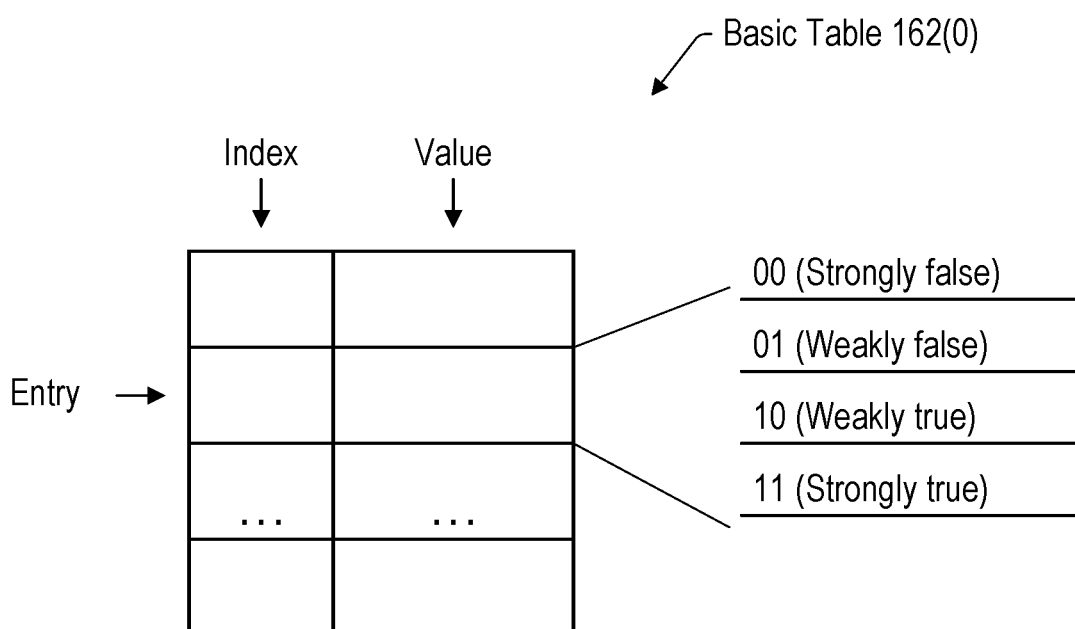
FIG. 2B shows one embodiment of a basic table of an instruction prediction circuit.

FIG. 2B shows an example basic table 162(0) of the instruction prediction circuit 160. For purposes of illustration, the basic table 162(0) is provided also as an example to illustrate the tables 162(i) of the tagged predictors $T_i$ (1≤i≤M). In the illustrated embodiment, the tables 162(i) of the tagged predictors $T_i$ (1≤i≤M) may be similar to the basic table 162(0), e.g., also provide a value at each entry, but further include additional information such as the history-related geometric series. In addition, the basic table 162(0) may also illustrate distinctions between the bias prediction circuit 156 and the instruction prediction circuit 160. As indicated in FIG. 2B, in the illustrated embodiment, the values in the basic table 162(0) may be 2-bit values. For example, a value "00" may indicate that the condition of a conditional instruction is strongly false. A value "01" may indicate that the condition of a conditional instruction is weakly false. A value "10" may indicate that the condition of a conditional instruction is weakly true. A value "11" may indicate that the condition of a conditional instruction is strongly true. Thus, the values in the table 162(0) of the instruction prediction circuit 160 may not necessarily indicate the biasness of a conditional instruction, but only whether it is true or false with certain relativity. For example, the value "00" may indicate that a conditional instruction is predictively more likely to be false, compared to the value "01." Similarly, the value "11" may indicate that conditional instruction is predictively more likely to be true, compared to the value "10." Note that the basic table 162(0) in FIG. 2B is provided only as an example for purposes of illustration. In some embodiments, the values in the basic table 162(0) and/or the tables 162(i) of the tagged predictors $T_i$ (1≤i≤M) may have less or more bits.

Figure 3A:
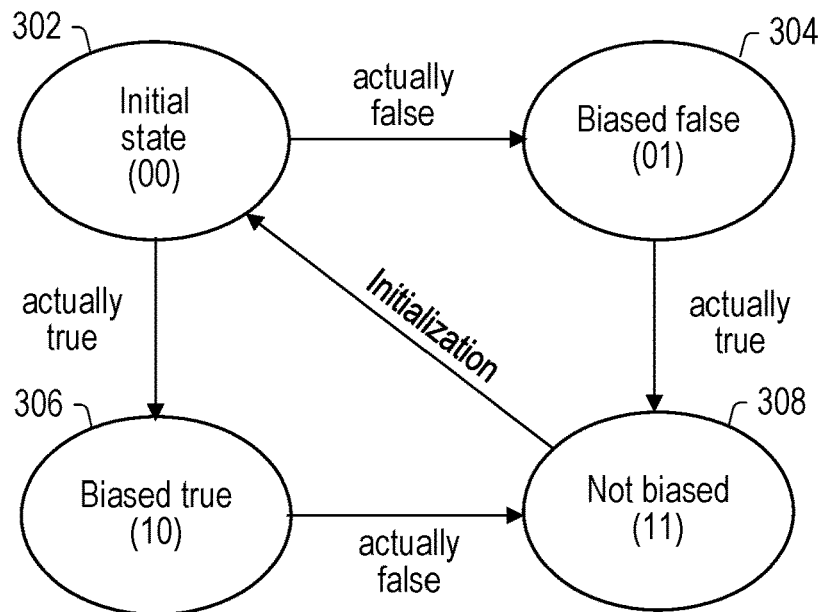
FIG. 3A is a block diagram of one embodiment of operations of a bias prediction circuit.
Figure 3B:
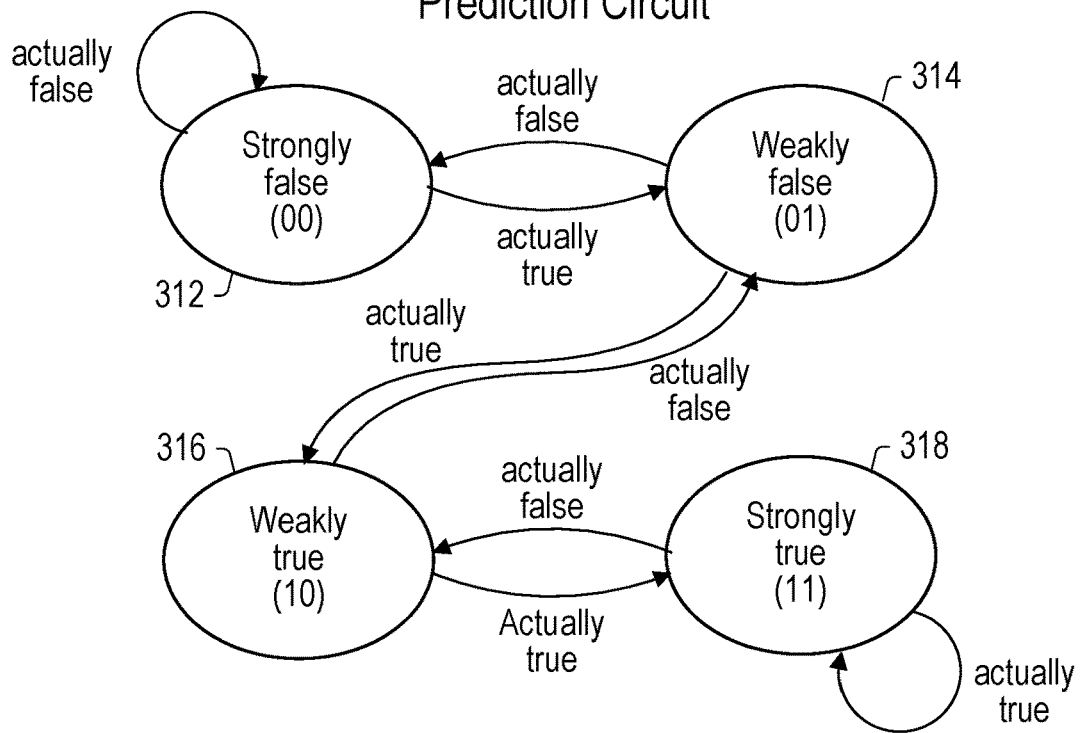
FIG. 3B is a block diagram of one embodiment of operations of an instruction prediction circuit.

Turning now to FIGS. 3A and 3B, state machines of the bias prediction circuit 156 and instruction prediction circuit 160 are shown to illustrate operations of the respective prediction circuits. As indicated in FIG. 3A, the circles 302, 304, 306, and 308 may correspond to the four possible predictions in the bias table 158 of the bias prediction circuit 156 in FIG. 2A. Similarly, in FIG. 3B, the circles 312, 314, 316, and 318 may correspond to the four possible predictions in the table(s) 162 of the instruction prediction circuit 160 in FIG. 2B. Further, the edges connecting the circles in the respective tables may indicate the change of the values at update.

Referring back to FIG. 3A, in the illustrated embodiment, the value "00" may be designed as an initial state or default value for conditional instructions. For example, at start-up, the value for a conditional instruction in the bias table 158 may be set as the default value "00." When a conditional instruction is loaded from memory or cache 12 to Icache 102 for the first time, assuming that there is no hash collision yet with respect to the conditional instruction, it may be the first time for the bias prediction circuit 156 to encounter a conditional instruction that corresponds to an entry of the conditional instruction in the bias table 158. Accordingly, the value for the conditional instruction in the bias table 158 may be "00" (e.g., corresponding to the circle 302). Because the value "00" does not indicate that the condition of the conditional instruction is biased true or bias false, the fetch and decode circuit 100 may further use the instruction prediction circuit 160 to provide a second prediction, such as an instruction prediction, for the conditional instruction. As described above, the instruction prediction circuit 160 may use the table(s) 162 to provide the instruction prediction. In the illustrated embodiment, similarly, the processor 30 may designate one of the four possible states as the initial state or default value for the conditional instruction. For purposes of illustration, it is assumed that the initial state or default value for the conditional instruction is "10" (e.g., corresponding to the circle 316), indicating that the condition is predicted as weakly true. According to the instruction prediction from the instruction prediction circuit 160, the fetch and decode circuit 100 may determine a target address based on which a subsequent instruction may be speculatively obtained for execution. Consider the foregoing example code including the conditional instruction "if (a>b)." Since the conditional instruction is predicted to be "weakly true," the fetch and decode circuit 100 may speculatively obtain the subsequent instruction "x=1" for execution.

After execution of the instruction, e.g., in the execution pipeline 164, the condition of the conditional instruction may be actually determined, and the bias prediction from the bias prediction circuit 156 and the instruction prediction from the instruction prediction circuit 160 may be evaluated according to the outcome of the execution of the conditional instruction. In the illustrated embodiment, the bias table 158 of the bias prediction circuit 156 and/or the table(s) 162 of the instruction prediction circuit 160 may get updated based on the evaluation. For example, when the evaluation turns out that the condition of the conditional instruction is actually true, it means that the previous bias prediction from the bias prediction circuit 156 (which is the initial state or default value "00") is a misprediction. Accordingly, in the bias table 158, the value for the conditional instruction may change from "00" (e.g., initial state) to "10" (e.g., biased true). In FIG. 3A, this is illustrated by the change from the circle 302 (e.g., corresponding to "00") to the circle 306 (e.g., corresponding to "10"). By comparison, the evaluation of the conditional instruction may confirm that the previous instruction prediction from the instruction prediction circuit 160 is not a misprediction. Accordingly, in the table(s) 162, the value(s) for the conditional instruction may change from "10" (e.g., weakly true) to "11" (e.g., strongly true), representing that the instruction prediction circuit 160 gets a reward. In FIG. 3B, this is illustrated by the change from the circle 316 (e.g., corresponding to "10") to the circle 318 (e.g., corresponding to "11").

Conversely, when the evaluation of the conditional instruction turns out that the condition of the conditional instruction is actually false, it means that the previous bias prediction from the bias prediction circuit 156 is a misprediction. Accordingly, in the bias table 158, the value for the conditional instruction may change from "00" (e.g., initial state) to "01" (e.g., biased false). In FIG. 3A, this is illustrated by the change from the circle 302 (e.g., corresponding to "00") to the circle 304 (e.g., corresponding to "01"). Also, the evaluation of the conditional instruction may indicate that the previous instruction prediction from the instruction prediction circuit 160 is also a misprediction. Accordingly, in the table(s) 162, the value(s) for the conditional instruction may change from "10" (e.g., weakly true) to "01" (e.g., weakly true), representing that the instruction prediction circuit 160 get a penalty. In FIG. 3B, this is illustrated by the change from the circle 316 (e.g., corresponding to "10") to the circle 314 (e.g., corresponding to "01").

As indicated in FIG. 3A, once being updated to the value "10" (e.g., biased true) or "01" (e.g., biased false), the value of the conditional instruction in the bias table 158 may stay at "10" or "01" until a misprediction occurs. In other words, once the value for a conditional instruction in the bias table 158 gets updated from the initial state, the bias prediction circuit 156 may refrain from changing it to another value until a misprediction happens. From an operational perspective, it means that the bias prediction circuit 158 may unconditionally predict the condition of the conditional instruction in the same manner, until an evaluation of the conditional instruction indicates that the bias prediction is a misprediction. When such a misprediction occurs, the value of the conditional instruction in the bias table 158 may be updated from "10" or "01" to "11" (e.g., not biased). In FIG. 3A, this is illustrated by the change from the circle 304 (e.g., corresponding to "01") or 306 (e.g., corresponding to "10") to the circle 308 (e.g., corresponding to "11"). In addition, once being updated to the value "11," the value of the conditional instruction in the bias table 158 may stay at "11" (e.g., not biased) until the prediction circuit 156 resets the value to the initial state or default value "00."

As indicated in FIG. 3B, the value(s) of the conditional instruction in the table(s) 162 may change from one value to another at update, depending on whether the instruction prediction circuit 160 gets a reward or penalty. For example, when an evaluation of the conditional instruction confirms that the instruction prediction from the instruction prediction circuit 160 is not a misprediction, the instruction prediction circuit 160 may receive a reward to change the value(s) of the conditional instruction in the table(s) 162 from a relatively weaker prediction to a relatively stronger prediction (e.g., from weakly true to strongly true, or from weakly false to strongly false), or remain at the relatively stronger prediction (e.g., strongly true or strongly false). Conversely, when an evaluation of the conditional instruction indicates that the instruction prediction from the instruction prediction circuit 160 is a misprediction, the instruction prediction circuit 160 may receive a penalty to change the value(s) of the conditional instruction in the table(s) 162 from a relatively stronger prediction to a relatively weaker prediction (e.g., from strongly true to weakly true, or from strongly false to weakly false), or even from a relatively weaker prediction to an opposite relatively weaker prediction (e.g., from weakly true or weakly false, or vice versa). Note that in the illustrated embodiment, the value for a conditional instruction in the table(s) 162 may not change from one relatively stronger prediction directly to an opposite relatively stronger prediction (e.g., from strongly true to strongly false, or vice versa). Thus, the table(s) 162 may be considered to have a certain level of hysteresis.

Further, as described above, when the condition of a conditional instruction is predicted to be biased true or biased false, e.g., when the value for the conditional instruction in the bias table 158 is "10" or "01", the fetch and decode circuit 100 may use the bias prediction from the bias prediction 156 to speculatively process the conditional instruction. Conversely, when the condition of a conditional instruction is predicted not to be biased true or biased false, e.g., when the value for the conditional instruction in the bias table 158 is "00" or "11", the fetch and decode circuit 100 may use the instruction prediction from the instruction prediction circuit 160 to speculatively process the conditional instruction.

In the illustrated embodiment, the bias table 158 and/or the table(s) 162 may be implemented using one or more registered. In addition, the fetch and decode circuit 100 may encode the bias prediction from the bias prediction circuit 156 and/or the instruction prediction from the instruction prediction circuit 160 in the instruction line that contains the conditional instruction. For example, the fetch and decode circuit 100 may append the value (e.g., the 2-bit value) for the conditional instruction from the bias table 158 and/or the table(s) 162 to the machine code of the instruction line that includes the conditional instruction at the front, back, or in the middle. Alternatively, the fetch and decode circuit 100 may recode the machine code of the instruction line that includes the conditional instruction to embed the prediction(s) for the conditional instruction. For example, the fetch and decode circuit 100 may change the values of one or more bits of the machine code. Accordingly, when the instruction with the appended value is received at the Icache 102 and/or the decoder 154, the Icache 102 and/or the decoder 154 may recognize the prediction(s) of the conditional instruction, and speculatively process the conditional instruction based on the prediction(s) as described above.

In the illustrated embodiment, when a conditional instruction is predicted to be biased true or biased false, sometimes the fetch and decode circuit 100 may cause the conditional instruction to "bypass" the instruction prediction circuit 160. In the illustrated embodiment, to implement the "bypass," the fetch and decode circuit 100 may recode the conditional instruction to a non-conditional instruction. As a result, the instruction prediction circuit 160 may treat the conditional instruction as a non-conditional instruction, and thus may not necessarily provide an instruction prediction for the recoded conditional instruction.

As described above, the bias prediction circuit 156 and/or the instruction prediction circuit 160 may mispredict conditional instructions. As a result, the bias prediction circuit 156 and/or the instruction prediction circuit 160 may get saturated. For example, when a code is executed by the processor 30 for a relatively long time, the bias prediction circuit 156 may experience sufficient mispredictions for one or more conditional instructions of the code. As a result, the values for the conditional instructions in the bias table 158 may change to the value "11." As described above, once the values change to "11," they may remain as "11" until reset. Thus, to resolve the saturation, in the illustrated embodiment, the bias prediction circuit 156 and/or the instruction prediction circuit 160 may respectively detect occurrence of a saturation, and responsively reset the bias table 158 and/or the table(s) 162. For example, the bias prediction circuit 156 may monitor the number of values "11" in the bias table 158. When it reaches a specified threshold, e.g., a specified percentage, the bias prediction circuit 156 may determine that the bias table 158 has saturated. As a result, the bias prediction circuit 156 may reset those values "11" to the initial state "00." Sometimes, the bias prediction circuit 156 may also reset other values in the bias table 158, e.g., the entire bias table 158, to the initial state "00" as well.

Figure 4:
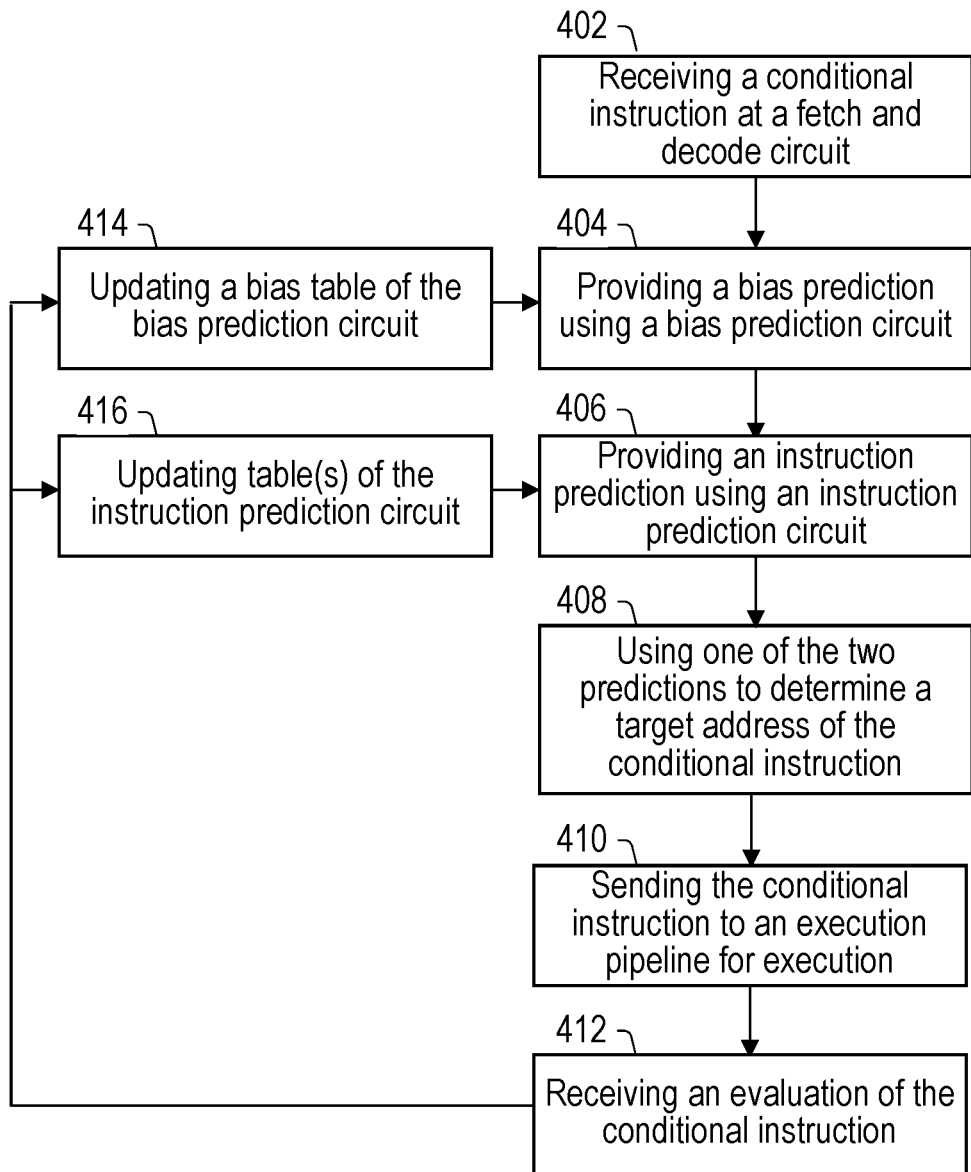
FIG. 4 is a flowchart illustrating one embodiment of operations of a processor including a bias prediction circuit and an instruction prediction circuit.

Turning now to FIG. 4, a flowchart illustrating one embodiment of operations of a processor 30 including a bias prediction circuit 156 and an instruction prediction circuit 160 is shown. In the illustrated embodiment, a conditional instruction may be received at a fetch and decode circuit 100, as indicated in block 402. As described above, the conditional instruction may be loaded from the memory or cache 12 to the Icache 102, or fetched from the Icache 102 to the decoder 154. The fetch and decode circuit 100 may use the bias prediction circuit 156 to provide a bias prediction whether the condition of the conditional instruction is biased true or biased false, as indicated in block 404. In the illustrated embodiment, the bias prediction circuit 156 may make the bias prediction using the bias table 158, as indicated in block 404. As described above, when the condition of the conditional instruction is predicted to be biased true or biased false, it represents that the bias prediction circuit 156 predicts that the condition of the conditional instruction is always true or always false.

When the bias prediction from the bias prediction circuit 156 predicts that the condition of the conditional instruction is not biased true or biased false, the fetch and decode circuit 100 may use the instruction prediction circuit 160 to provide an instruction prediction whether the condition of the conditional instruction is true or false, as indicated in block 406. As described above, in the illustrated embodiment, the instruction prediction circuit 160 may be a TAGE predictor having a total of (M+1) predictors, such as a basic predictor $T_0$ with a basic table 162(0) and one or more additional (partially) tagged predictors $T_i$ with respective tables 162($i$) ($1 \leq i \leq M$). The tables 162($i$) of the tagged predictors $T_i$ ($1 \leq i \leq M$) may be associated with a history-related geometric series of a respective history length.

As described above, in the illustrated embodiment, when the bias prediction circuit 156 predicts that the condition of the conditional instruction is biased true or biased false, the fetch and decode circuit 156 may cause the conditional instruction to "bypass" the instruction prediction circuit 160. As a result, the operations in block 406 may be avoided. For example, the fetch and decode circuit 100 may recode the conditional instruction to a non-conditional instruction. Further, as described above, in the illustrated embodiment, the bias prediction from the bias prediction circuit 156 and the instruction prediction from the instruction prediction circuit 160 may be provided as different stages of processing the conditional instruction in the fetch and decode circuit. For example, the bias prediction circuit 156 may provide the bias prediction at the prefetch stage when the conditional instruction is loaded from the memory or cache 12 to Icache 102, while the instruction prediction circuit 160 may perform the instruction prediction at the fetch stage when the conditional instruction is fetched from the Icache 102 to the decoder 154.

In the illustrated embodiment, the fetch and decode circuit 100 may use one of the bias prediction from the bias prediction circuit 156 and the instruction prediction from the instruction prediction circuit 160 to speculatively determine a target address for the conditional instruction, as indicated in block 408. For example, the fetch and decode circuit 100 may speculatively determine a target address of the conditional instruction from which a subsequent instruction may be obtained for execution, according to the bias prediction from the bias prediction circuit 156 or the instruction prediction from the instruction prediction circuit 160.

In the illustrated embodiment, the fetch and decode circuit 100 may send the conditional instruction to the execution pipeline 164 for execution, as indicated in block 410. Further, the fetch and decode circuit 100 may receive an evaluation of the conditional instruction based on an outcome of the execution of the conditional instruction, as indicated in block 412. As described above, the execution of the conditional instruction may determine whether the condition of the conditional instruction is actually true or false, and accordingly whether the previous bias prediction from the bias prediction circuit 156 and/or the previous instruction prediction from the instruction prediction circuit 160 is a misprediction.

In the illustrated embodiment, the bias prediction circuit 156 and/or the instruction prediction circuit 160 respectively update their bias table 158 and the table(s) 162 based on the evaluation of the conditional instruction, as indicated in block 414 and 416. As described above in FIGS. 2-3, the update of the bias table 158 may change the value for the conditional instruction from an initial state such as "00" to "01" (e.g., indicating biased false) or "10" (e.g., indicating biased true) respectively when the evaluation indicates that the condition of the conditional instruction is actually true or false, or change the value from "01" or "10" to "11" (e.g., indicating not biased) when the evaluation indicates that the previous biased true or biased false prediction is actually a misprediction. By comparison, the instruction prediction circuit 160 may update the value(s) for the conditional instruction in the table(s) 162($i$) of the basic and tagged predictors $T_i$ ($0 \leq i \leq M$) from a relatively weaker prediction to a relatively stronger prediction (e.g., from weakly true "10" to strongly true "11," or from weakly false "01" to strongly false "00"), or remain the value at the relatively stronger prediction (e.g., strongly true "11" or strongly false "00"), when the evaluation confirms that the instruction prediction from the instruction prediction circuit 160 is not a misprediction; or from a relatively stronger prediction to a relatively weaker prediction (e.g., from strongly true "11" to weakly true "10," or from strongly false "00" to weakly false "01"), or from a relatively weaker prediction to an opposite relatively weaker prediction (e.g., from weakly true "10" or weakly false "01," or vice versa), when the evaluation indicates that the instruction prediction from the instruction prediction circuit 160 is a misprediction.

Figure 5:
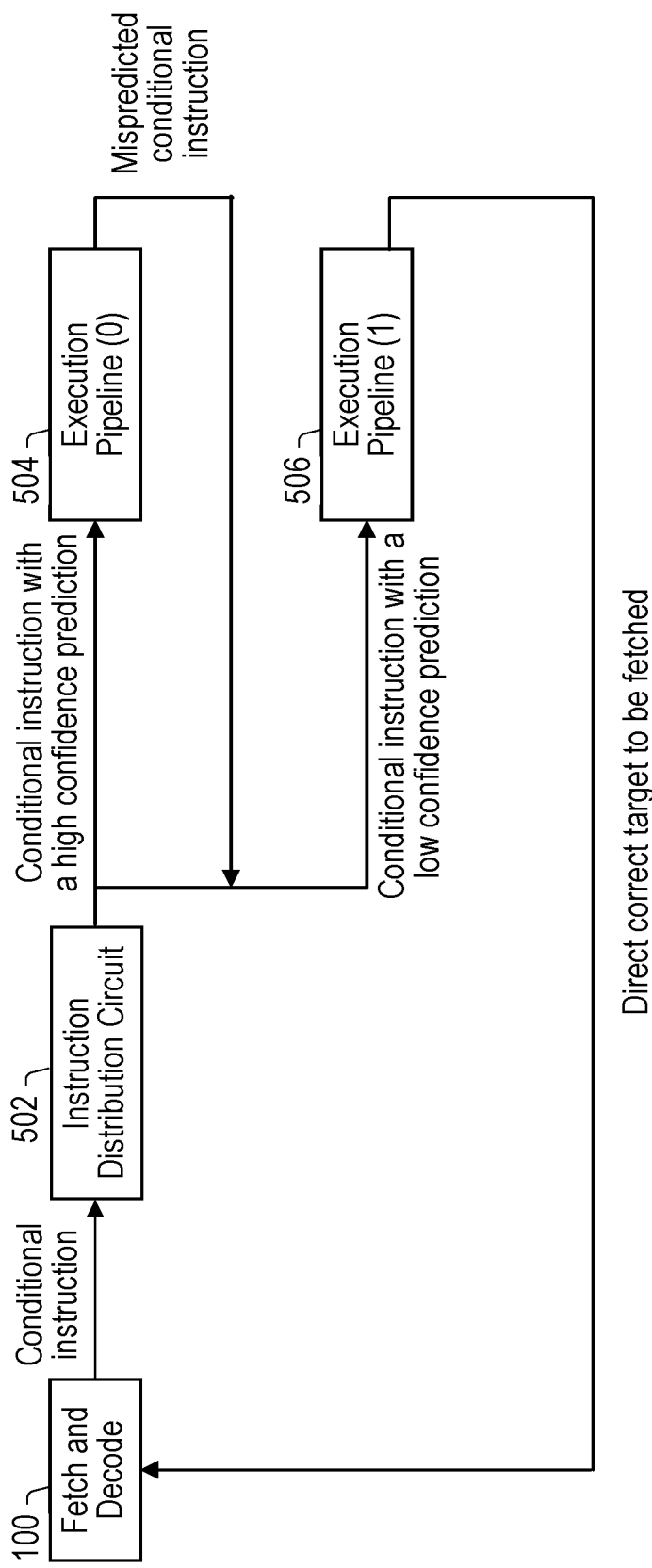
FIG. 5 is a block diagram of one embodiment of a portion of a processor including an instruction distribution circuit and a plurality of execution pipelines.

Turning now to FIG. 5, a block diagram of one embodiment of a portion of a processor 30 including an instruction distribution circuit 502 and execution pipelines 504 and 506 is shown. In FIG. 5, the instruction distribution circuit 502 may receive a conditional instruction associated with a prediction from the fetch and decode circuit 100, and distribute the conditional instruction to one of the plurality of execution pipelines such as 504 and 506 according to a confidence level of the prediction of the conditional instruction. When it is determined that the conditional instruction has a relatively high confidence level, the instruction distribution circuit may distribute the conditional instruction to a first execution pipeline 504. Conversely, when it is determined that the conditional instruction has a relatively low confidence level, the instruction distribution circuit may distribute the conditional instruction to a second execution pipeline 506. One difference between the execution pipelines 504 and 506 may be that the execution pipeline 506, but not the execution pipeline 504, may have the ability to redirect the fetch and decode 100 to obtain an instruction from a correct target address for execution (also called re-fetch), when the conditional instruction is mispredicted.

Therefore, when the execution pipeline 504 detects a misprediction for a conditional instruction, the execution pipeline 504 may have to use the execution pipeline 506 to instruct the re-fetch of an instruction from a correct target address for execution. For example, the execution pipeline 504 may create a bubble in the execution pipeline 506, and then insert the conditional instruction in the bubble for it to be executed by the execution pipeline 506. Once the execution pipeline 506 executes the conditional instruction also determine that the conditional instruction is mispredicted, the execution pipeline 506 may redirect the fetch and decode 100 to re-fetch the instruction from the correct target address for execution. For example, the execution pipeline 506, but not the execution pipeline 504, may have a communication path to the fetch and decode circuit 100, through which the execution pipeline 506 may instruct the fetch and decode circuit 100 to perform the re-fetch. Given that the conditional instruction is already executed in the execution pipeline 504, the second execution of the conditional instruction in the execution pipeline 506 may be also considered a re-execution or replay of the conditional instruction. Further, in the illustrated embodiment, the execution pipeline 506 may also use the bubble to execute one or more non-conditional instructions together with the mispredicted conditional instruction. For example, the execution pipeline 506 may execute the one or more non-conditional instructions in the same cycle, created by the bubble, as the mispredicted conditional instruction.

In the illustrated embodiment, when it detects a mispredicted conditional instruction, the execution pipeline 504 may not necessarily write back results to any registers or memory until the instruction from the correct target address is successfully executed by the execution pipeline 504. This warrants that only the correct result be written to the registers or memory. However, this may also delay the retirement of the execution pipeline 504 and thus cause additional delays to the execution pipeline 504. By comparison, when the mispredicted conditional instruction is initially distributed to the execution pipeline 506, the execution pipeline 506 may detect the misprediction and directly cause the fetch and decode circuit 100 to obtain the execution from the correct target address for execution, thus causing minimal delays to the execution. Thus, the Ser. No. 17/590,722 (2888-38401 execution pipeline 504 may be considered a "slow" execution pipeline, while the execution pipeline 506 as a "fast" execution pipeline, due to the different latencies in the processing of mispredicted conditional instructions. Sometimes, the execution pipelines 504 and 506 may include identical stages or an identical number of stages. In other words, for conditional instructions without mispredictions, the execution pipelines 504 and 506 may not necessarily have different latencies, and the different latencies only exist for mispredicted conditional instructions because the execution pipeline 504 lacks the ability to directly instruct the fetch and decode circuit 100 for re-fetch. Alternatively, sometimes the execution pipeline 504 may have more stages or a larger number of stages than the execution pipeline 506. As a result, regardless of whether a conditional instruction is mispredicted or not, the execution pipeline 504 may always have a larger latency than the execution pipeline 506.

In the illustrated embodiment, the prediction of an conditional instruction that is used by the instruction distribution circuit 502 to distribute the conditional instruction may be (a) the bias prediction from the bias prediction circuit 156 or (b) the instruction prediction from the instruction prediction circuit 160. For example, as described above, when the bias prediction circuit 156 provides a bias prediction that the condition of the conditional instruction is biased true or biased false, the fetch and decode circuit 100 may use the bias prediction to speculatively process the conditional instruction. In that case, the instruction distribution circuit 502 may use the bias prediction from the bias prediction circuit 156 to determine the distribution of the conditional instruction. Conversely, when the bias prediction circuit 156 predicts that the condition of the conditional instruction is not biased true or biased false, the fetch and decode circuit 100 may use the instruction prediction from the instruction prediction circuit 160 to speculatively process the conditional instruction. In that case, the instruction distribution circuit 502 may use the instruction prediction from the instruction prediction circuit 160 to determine the distribution of the conditional instruction. In other words, the prediction of the conditional instruction disclosed herein may be the prediction of the conditional instruction based on which the fetch and decode circuit 100 speculatively process the conditional instruction.

In the illustrated embodiment, the confidence level of the prediction may be determined with respect to one or more criteria. For example, when the prediction of a conditional instruction is a bias prediction from the bias prediction circuit 156 (e.g., when the conditional instruction is predicted as biased true or biased false), the instruction distribution circuit 502 may determine that the prediction has a high confidence level. Also, when the prediction is an instruction prediction from the instruction prediction circuit 160 (e.g., when the conditional instruction is not predicted as biased true or biased false), the instruction distribution circuit 502 may determine that the prediction has a high confidence level if the instruction prediction is provided by a tagged predictor $T_i$ with a saturated counter or a tagged predictor $T_i$ with a high-order table (e.g., when the instruction prediction circuit 160 is a TAGE predictor). Otherwise, when the prediction of a conditional instruction fails to satisfy the above one or more criteria, the instruction distribution circuit 502 may determine that the prediction has a low confidence level.

When the confidence level is high, the instruction distribution circuit 502 may distribute the conditional instruction to the "slow" execution pipeline 504. Conversely, when the confidence level is low, the instruction distribution circuit 502 may distribute the conditional instruction to the execution pipeline 506 (e.g., the "slow" execution pipeline). From an operational perspective, it means that when a conditional instruction is predicted with a high confidence level, the instruction distribution circuit 502 may presume that the conditional instruction is less likely to be mispredicted, and thus execution of the conditional instruction in the execution pipeline 504 (e.g., the "slow" execution pipeline) may have a lower probability to cause re-fetch. By comparison, when a conditional instruction is predicted with a low confidence level, the instruction distribution circuit 502 may presume that the prediction is more likely to be erroneous. Thus, the instruction distribution circuit 502 may distribute the conditional instruction to the execution pipeline 506 (e.g., the "fast" execution pipeline) to reduce potential delays for re-fetch.

Sometimes, the instruction distribution circuit 502 may perform load balancing between the execution pipelines 504 and 506. For example, the instruction distribution circuit 502 may distribute conditional instructions to the execution pipelines 504 and 506 based on occupancies of the execution pipelines, rather than the predictions of the conditional instructions. For example, when the execution pipeline 504 is overloaded and the execution pipeline 506 is underoccupied, the instruction distribution circuit 502 may distribute a conditional instruction associated with a prediction of a high confidence level to the execution pipeline 506 for execution.

Figure 6:
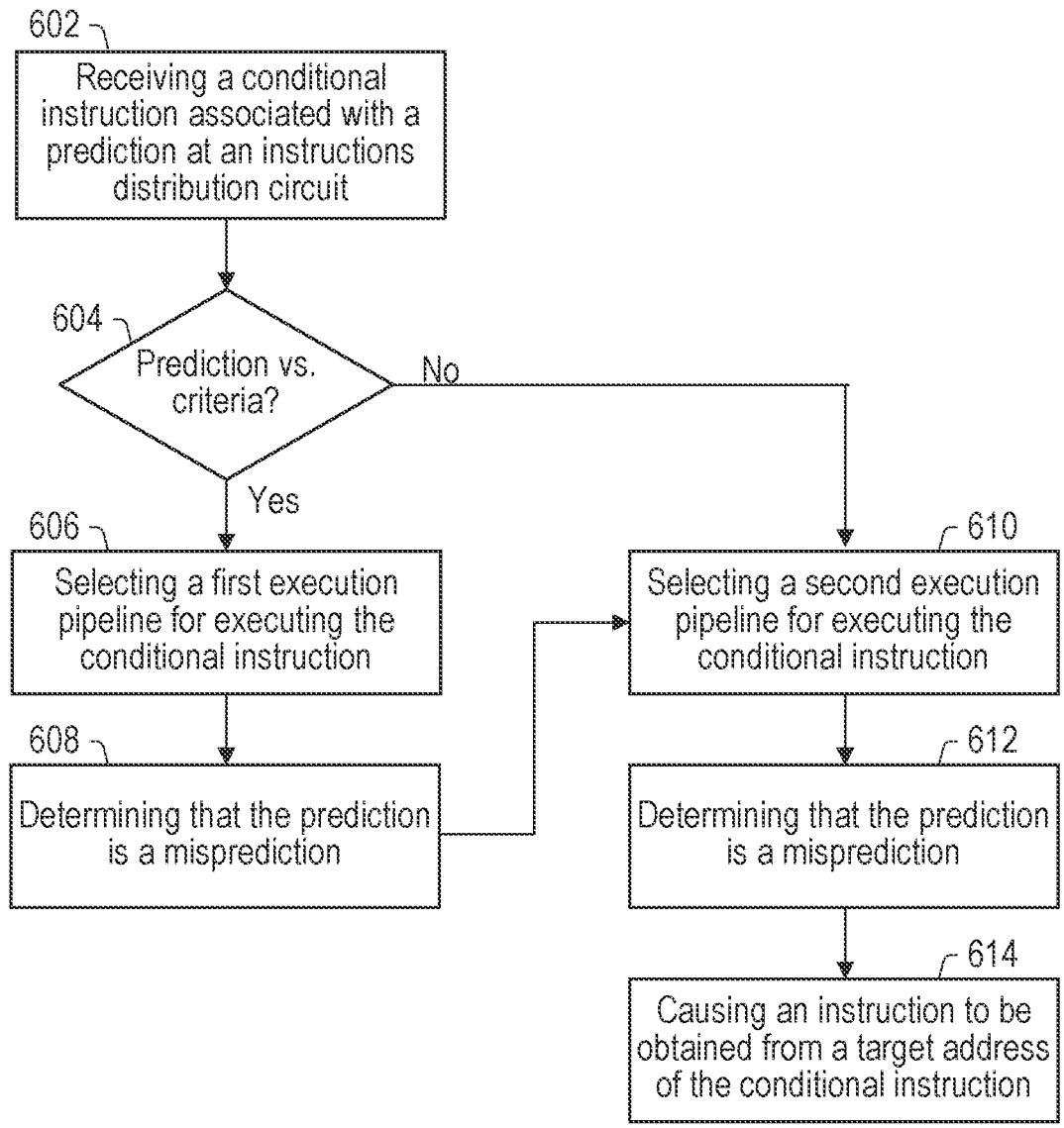
FIG. 6 is a flowchart illustrating one embodiment of operations of a processor including an instruction distribution circuit and a plurality of execution pipelines.

Turning now to FIG. 6, a flowchart illustrating one embodiment of operations of a processor 30 including an instruction distribution circuit 502 and different execution pipelines 504 and 506 is shown. In the illustrated embodiment, a conditional instruction associated with a prediction may be received at the instruction distribution circuit 502, as indicated in block 602. As described above, the prediction of the conditional instruction may be (a) a bias prediction from a bias prediction circuit 156 or (b) an instruction prediction from an instruction prediction circuit 160.

In the illustrated embodiment, the instruction distribution circuit 502 may evaluate the prediction of the conditional instruction with respect to one or more criteria to determine a confidence level of the prediction, as indicated in block 604. For example, the instruction distribution circuit 502 may determine whether the prediction is a bias prediction (e.g., bias true or biased false) provided by the bias prediction circuit 156, or an instruction prediction (e.g., true or false) provided by a tagged predictor $T_i$ with a saturated counter or a tagged predictor $T_i$ with a high-order table of the instruction prediction circuit 160 (e.g., when the instruction prediction circuit 160 is a TAGE predictor). If so, the instruction distribution circuit 502 may determine that the conditional instruction has a high confidence level. Otherwise, the instruction distribution circuit 502 may determine that the conditional instruction has a low confidence level.

The instruction distribution circuit 502 may distribute the conditional instruction to one of a plurality of execution pipelines according to the confidence level of the prediction of the conditional instruction with respect to the one or more criteria. For example, when the confidence level is high, the instruction distribution circuit 502 may distribute the conditional instruction to the execution pipeline 504 (e.g., the "slow" execution pipeline) for execution, as indicated in block 606. Otherwise, when the confidence level is low, the instruction distribution circuit 502 may distribute the conditional instruction to the execution pipeline 506 (e.g., the "fast" execution pipeline) for execution, as indicated in block 610.

When the conditional instruction is distributed to the execution pipeline 504, the execution of the conditional instruction may determine that the prediction of the conditional instruction is a misprediction, as indicated in block 608. In response, the execution pipeline 504 may cause the mispredicted conditional instruction to be re-executed or replayed in the execution pipeline 506, as indicated in block 610. As described above, in the illustrated embodiment, the execution pipeline 504 may create a bubble in the execution pipeline 506, and insert the mispredicted conditional instruction in the bubble for it to be executed by the execution pipeline 506. As described above, the execution of the conditional instruction in the execution pipeline 506 may determine that the conditional instruction is mispredicted, as indicated in block 612. The execution pipeline 506 may direct the fetch and decode circuit 100 to obtain an instruction from a correct target address of the conditional instruction for execution, as indicated in block 614.

Figure 7:
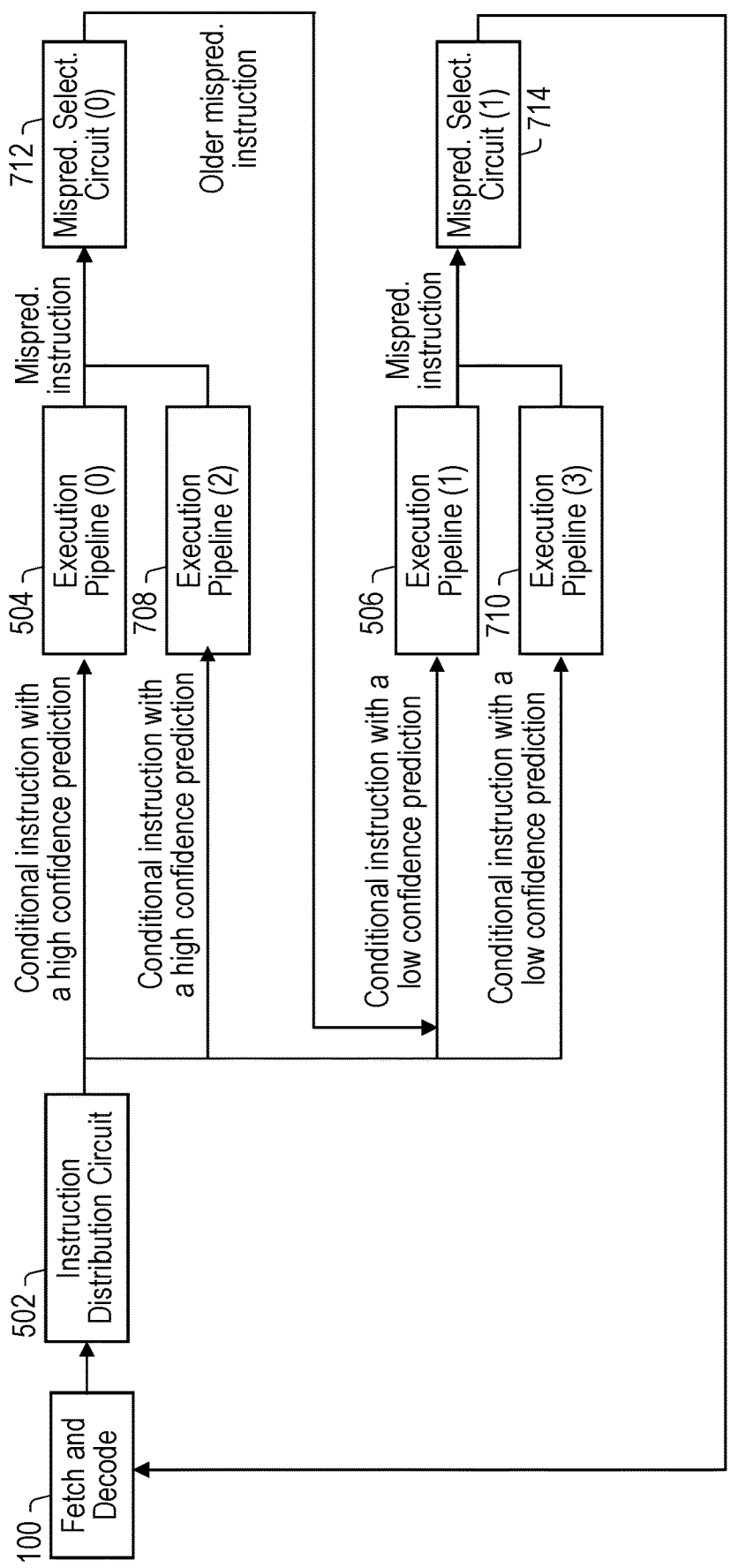
FIG. 7 is a block diagram of another embodiment of a portion of a processor including an instruction distribution circuit and a plurality of execution pipelines.

Turning now to FIG. 7, a block diagram of one embodiment of a portion of a processor 30 including an instruction distribution circuit 502 and execution pipelines 504, 506, 708, and 710 is shown. In the illustrated embodiment, the execution pipeline 708 may be similar to the execution pipeline 504 (e.g., the "slow" execution pipeline) such that the execution pipeline 708 lacks the ability to directly instruct the fetch and decode circuit 100 to perform re-fetch for mispredicted conditional instruction. By comparison, the execution pipeline 710 may be similar to the execution pipeline 506 (e.g., the "fast" execution pipeline) such that the execution pipeline 710 may also be able to directly instruct the fetch and decode circuit 100 to perform re-fetch for mispredicted conditional instruction. For example, like the execution pipeline 506, the execution pipeline 710 may also have a communication path to the fetch and decode circuit to direct re-fetch for mispredicted conditional instructions. Thus, in FIG. 7, the processor 30 includes two "slow" execution pipelines (e.g., the execution pipelines 504 and 708) and two "fast" execution pipelines (e.g., the execution pipelines 506 and 710). Note that that FIG. 7 is provided only as an example for purposes of illustration. Sometimes, the processor 30 may include less or more "slow" execution pipelines, and/or less or more "fast" execution pipelines.

As indicated in FIG. 7, the instruction distribution circuit 502 may distribute conditional instructions to the execution pipelines 504, 506, 708, and 710 according to confidence levels of predictions of the conditional instructions. In the illustrated embodiment, the confidence level of the predictions of a conditional instruction may be determined with respect to one or more criteria, as described above in FIG. 5-6. Accordingly, the instruction distribution circuit 502 may distribute conditional instructions associated with predictions of high confidence levels to the execution pipelines 504 and 708 (e.g., the "slow" execution pipelines) for execution, and conditional instruction associated with predictions of low confidence levels to the execution pipelines 506 and 710 (e.g., the "fast" execution pipelines) for execution.

In the illustrated embodiment, the executions pipelines 504, 506, 708, and 710 may operate in parallel, thus processing one or more conditional instructions around the same time. However, in the illustrated embodiment, only one of the "fast" execution pipelines, such as the execution pipeline 506, may be used to re-execute or replay a mispredicted conditional instruction (in order to cause re-fetch) that is provided from the "slow" execution pipelines such as the execution pipelines 504 and 708. Thus, when both execution pipelines 504 and 708 respectively detect a mispredicted conditional instruction, the processor 30 may use a first misprediction selection circuit 712 to select one of the mispredicted conditional instructions from the execution pipelines 504 and 708 for re-execution or replay in the execution pipeline 506, as indicated in FIG. 7.

In the illustrated embodiment, the selection may be performed according to ages of the two mispredicted conditional instructions respectively of the execution pipelines 504 and 708. For example, the first misprediction selection circuit 712 may compare the age of a first mispredicted conditional instruction in the execution pipeline 504 and the age of a second mispredicted conditional instruction in the execution pipeline 708, and cause the older one of the two conditional instructions to be executed in the execution pipeline 506. The age of a conditional instruction may be obtained in one of various ways. For example, the fetch and decode circuit 100 may assign a number, such as a Gnum, to a conditional instruction when it is decoded by the decoder 154. The Gnum may be a unique, monotonically increasing (or decreasing) number for each instruction. Thus, a younger instruction may be assigned with a smaller Gnum (or a larger Gnum), while an older instruction may be assigned with a larger Gnum (or a smaller Gnum). Accordingly, the first misprediction selection circuit 712 may compare the Gnums of the two conditional instructions to select the older conditional instruction. In addition, sometimes the age of a conditional instruction may also be determined based on the order of the conditional instruction in a reorder buffer (ROB) 108 of the processor 30.

Once the first misprediction selection circuit 712 makes the selection, the corresponding execution pipeline (e.g., the execution pipeline 504) may create a bubble in the execution pipeline 506, and insert the selected conditional instruction in the bubble for it to be executed by the execution pipeline 506. Once the execution pipeline 506 executes the conditional instruction and detects that it is mispredicted, the execution pipeline 506 may direct the fetch and decode circuit 100 to obtain an instruction from the correct target address of the mispredicted conditional instruction for execution, as described above. Note that the selection by the first misprediction selection circuit 712 may not necessarily mean the unselected mispredicted conditional instruction will not be re-executed or replayed by the execution pipeline 506. Instead, it only means that when both "slow" execution pipelines 504 and 708 detects a misprediction around the same time, to resolve the conflict, one of the conditional instructions may be selected to cause re-fetch first. Afterwards, the other unselected conditional instruction may be re-executed or replayed by the execution pipeline 506 to direct another re-fetch.

However, in the illustrated embodiment, given that the plurality of execution pipelines including the two "fast" execution pipelines 506 and 710 may process instructions in parallel, it is possible that the execution pipeline 710 (e.g., the second "fast" execution pipeline) may also detect a mispredicted conditional instruction around the same time when the execution pipeline 506 (e.g., the first "fast" execution pipeline) detects a mispredicted conditional instruction. This may also create a conflict. As indicated in FIG. 7, in that case, the processor 30 may use a second prediction selection circuit 714 to select one of the two mispredicted conditional instructions from the two "fast" execution pipelines 506 and 710 for re-fetch. For example, the second misprediction circuit 714 may compare the age of a first mispredicted conditional instruction in the execution pipeline 506 and the age of a second mispredicted conditional instruction in the execution pipeline 710, and select the older one of the two conditional instructions to direct the fetch and decode circuit 100 to obtain an instruction from a target address for execution.

Figure 8:
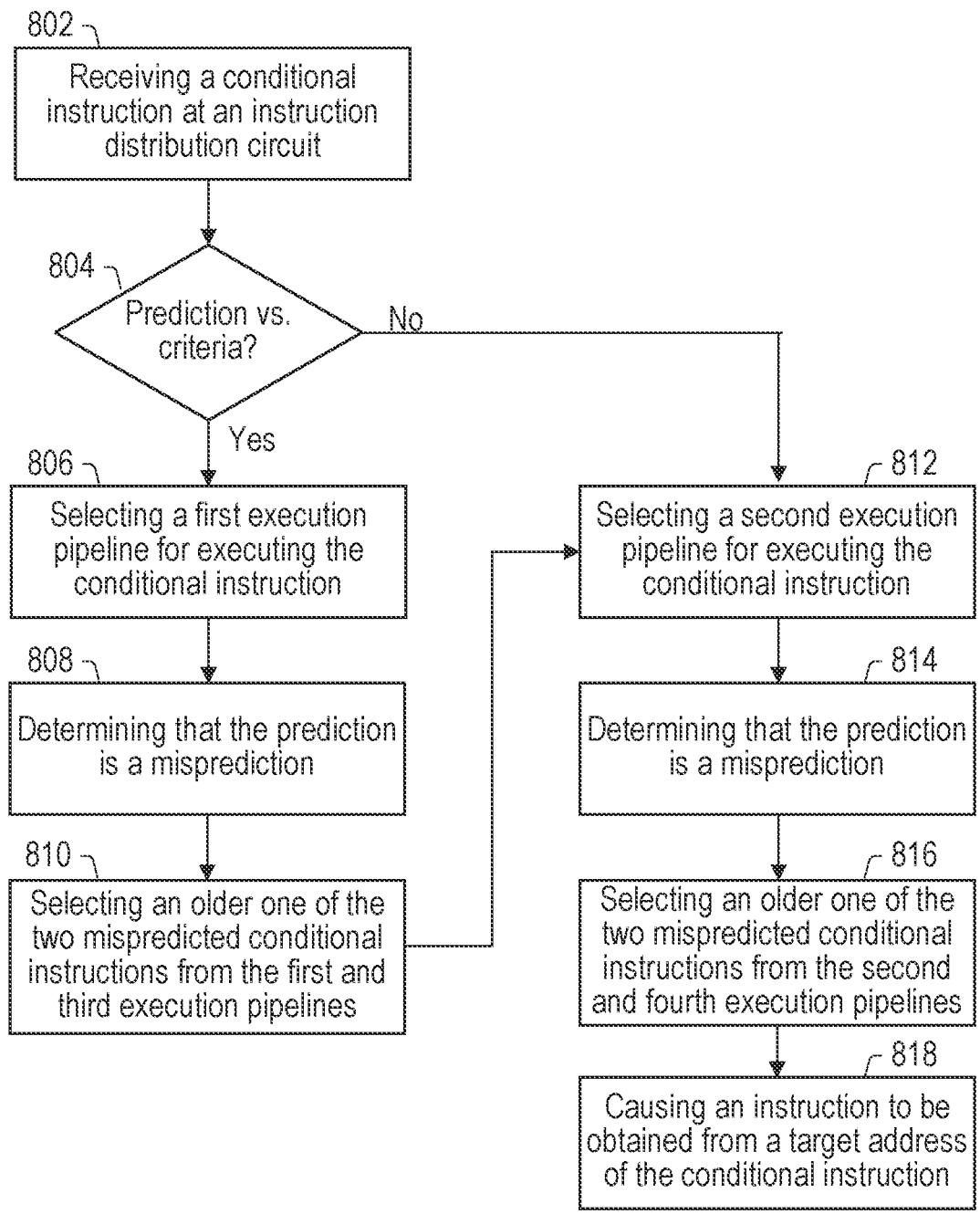
FIG. 8 is a flowchart illustrating another embodiment of operations of a processor including an instruction distribution circuit and a plurality of execution pipelines.

Turning now to FIG. 8, a flowchart illustrating one embodiment of operations of a processor 30 including the instruction distribution circuit 502 and different execution pipelines 504, 506, 708, and 710 is shown. In the illustrated embodiment, a conditional instruction associated with a prediction may be received at the instruction distribution circuit 502, as indicated in block 802. As described above, the prediction of the conditional instruction may be (a) a bias prediction from a bias prediction circuit 156 or (b) an instruction prediction from an instruction prediction circuit 160.

In the illustrated embodiment, the instruction distribution circuit 502 may evaluate the prediction of the conditional instruction with respect to one or more criteria to determine a confidence level of the prediction, as indicated in block 804. The instruction distribution circuit 502 may distribute the conditional instruction to one of a plurality of execution pipelines according to the confidence level of the prediction of the conditional instruction with respect to the one or more criteria. For example, when the confidence level is high, the instruction distribution circuit 502 may distribute the conditional instruction to one of the execution pipelines 504 and 708 (e.g., the "slow" execution pipeline) for execution, as indicated in block 806. Otherwise, when the Ser. No. 17/590, 722 (2888-38401 confidence level is low, the instruction distribution circuit 502 may distribute the conditional instruction to one of the execution pipelines 506 and 710 (e.g., the "fast" execution pipeline) for execution, as indicated in block 812.

When the conditional instruction is distributed to one of the execution pipelines 504 and 708, the execution of the conditional instruction may determine that the prediction of the conditional instruction is a misprediction, as indicated in block 808. However, the other one of the execution pipelines 504 and 708 may also detect a mispredicted conditional instruction around the same time. Thus, to resolve the conflict, the processor 30 may use the first misprediction selection circuit 712 to select one of the two mispredicted conditional instructions from the execution pipelines 504 and 708 to be re-executed or replayed by the execution pipeline 506, as indicated in block 810. In the illustrated embodiment, the selection may be performed based on ages of the two conditional instructions. For example, the first misprediction selection circuit 712 may compare the age of a first mispredicted conditional instruction in the execution pipeline 504 and the age of a second mispredicted conditional instruction in the execution pipeline 708, and cause the older one of the two conditional instructions to be executed in the execution pipeline 506, as indicated in block 812.

In the illustrated embodiment, the execution of the conditional instruction in the execution pipeline 506 may determine that the conditional instruction is mispredicted, as indicated in block 814. Further, the other execution pipeline 710 (e.g., the second "fast" execution pipeline) may also detect a mispredicted conditional instruction around the same time when the execution pipeline 506 detects a mispredicted conditional instruction. Thus, the processor 30 may use the second misprediction circuit 714 to select one of the two mispredicted conditional instructions from the execution pipelines 506 and 710, as indicated in block 816. Accordingly, the execution pipeline 506 or 710 of the selected mispredicted conditional instruction may instruct the fetch and decode circuit 100 to obtain an instruction from the correct target address of the selected mispredicted conditional instruction for execution, as indicated by block 818.

Figure 9:
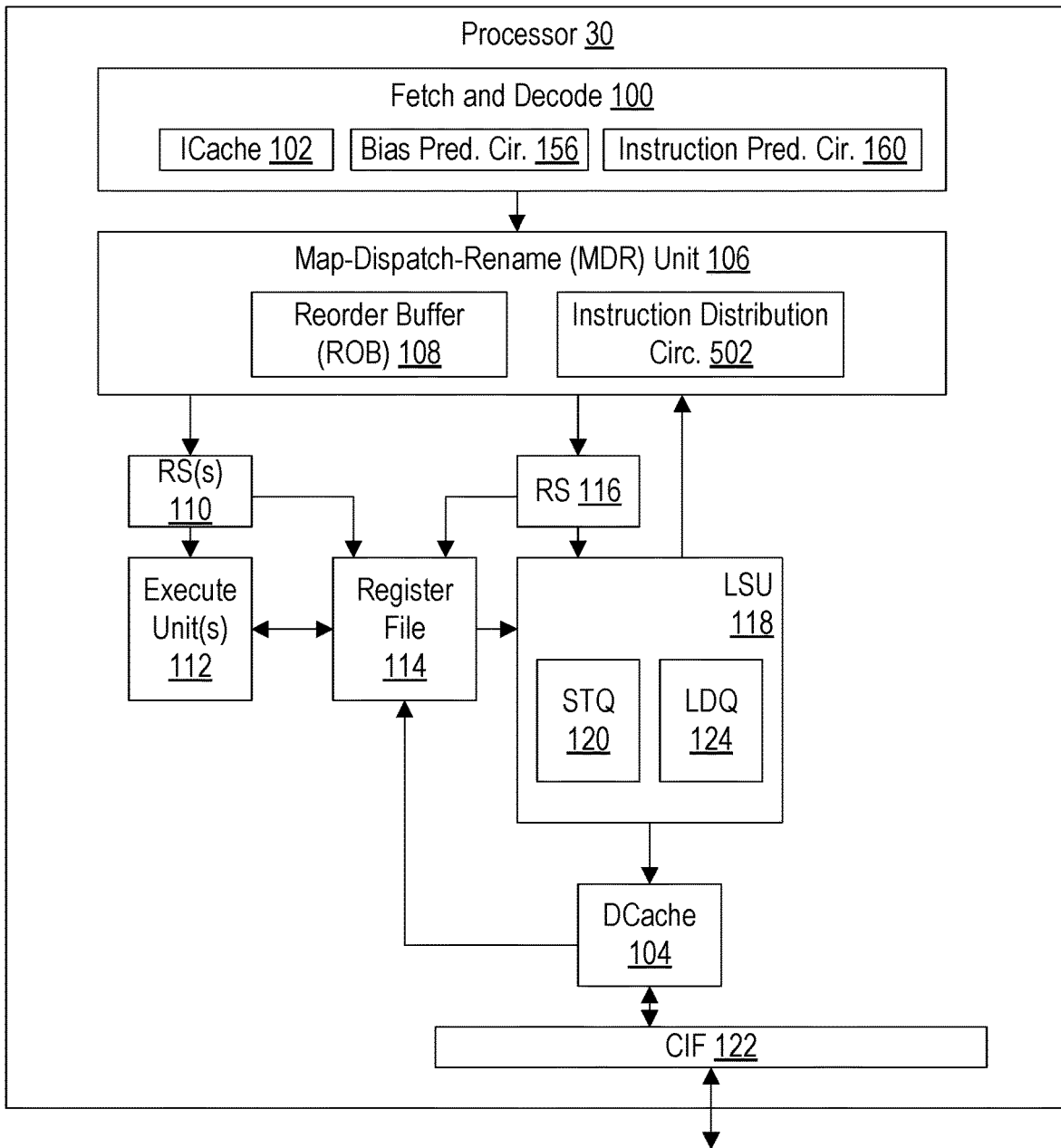
FIG. 9 is a block diagram of one embodiment of a processor shown in FIGS. 1-8 that includes a bias prediction circuit, an instruction prediction circuit, and/or an instruction distribution circuit.

FIG. 9 is a block diagram of one embodiment of a processor 30 that includes a bias prediction circuit 156, an instruction prediction circuit 160, and/or an instruction distribution circuit 502 described in FIGS. 1-8. Note that FIG. 9 is provided only as an example for purposes of illustration. Thus, sometimes the processor 30 may include not all but only part of the illustrated components. For example, sometimes the processor 30 may include a bias prediction circuit 156 and an instruction prediction circuit 160, but not an instruction distribution circuit 502.

In the illustrated embodiment, the processor 30 includes a fetch and decode unit 100 (including an instruction cache, or ICache, 102), a map-dispatch-rename (MDR) unit 106 (including a reorder buffer (ROB) 108), one or more reservation stations 110, one or more execute units 112, a register file 114, a data cache (DCache) 104, a load/store unit (LSU) 118, a reservation station (RS) for the load/store unit 116, and a core interface unit (CIF) 122. The fetch and decode unit 100 is coupled to the MDR unit 106, which is coupled to the reservation stations 110, the reservation station 116, and the LSU 118. The reservation stations 110 are coupled to the execution units 28. The register file 114 is coupled to the execute units 112 and the LSU 118. The LSU 118 is also coupled to the DCache 104, which is coupled to the CIF 122 and the register file 114. The LSU 118 includes a store queue 120 (STQ 120) and a load queue (LDQ 124).

The fetch and decode unit 100 may be configured to fetch instructions for execution by the processor 30 and decode the instructions into ops for execution. More particularly, the fetch and decode unit 100 may be configured to cache instructions previously fetched from memory (through the CIF 122) in the ICache 102, and may be configured to fetch a speculative path of instructions for the processor 30. As described above, in the illustrated embodiment, the fetch and decode unit 100 may include a bias prediction circuit 156 and an instruction prediction circuit 160 to provide respective predictions for conditional instruction. The fetch and decode unit 100 may implement various prediction structures to predict the fetch path. For example, a next fetch predictor may be used to predict fetch addresses based on previously executed instructions. Branch predictors of various types may be used to verify the next fetch prediction, or may be used to predict next fetch addresses if the next fetch predictor is not used. The fetch and decode unit 100 may be configured to decode the instructions into instruction operations. In some embodiments, a given instruction may be decoded into one or more instruction operations, depending on the complexity of the instruction. Particularly complex instructions may be microcoded, in some embodiments. In such embodiments, the microcode routine for the instruction may be coded in instruction operations. In other embodiments, each instruction in the instruction set architecture implemented by the processor 30 may be decoded into a single instruction operation, and thus the instruction operation may be essentially synonymous with instruction (although it may be modified in form by the decoder). The term "instruction operation" may be more briefly referred to herein as "operation" or "op."

The MDR unit 106 may be configured to map the ops to speculative resources (e.g., physical registers) to permit out-of-order and/or speculative execution, and may dispatch the ops to the reservation stations 110 and 116. As indicated in FIG. 9, in the illustrated embodiment, the MDR unit 106 may include an instruction distribution circuit 502. The ops may be mapped to physical registers in the register file 114 from the architectural registers used in the corresponding instructions. That is, the register file 114 may implement a set of physical registers that may be greater in number than the architectural registers specified by the instruction set architecture implemented by the processor 30. The MDR unit 106 may manage the mapping of the architectural registers to physical registers. There may be separate physical registers for different operand types (e.g., integer, media, floating point, etc.) in an embodiment. In other embodiments, the physical registers may be shared over operand types. The MDR unit 106 may also be responsible for tracking the speculative execution and retiring ops or flushing misspeculated ops. The reorder buffer 108 may be used to track the program order of ops and manage retirement/flush. That is, the reorder buffer 108 may be configured to track a plurality of instruction operations corresponding to instructions fetched by the processor and not retired by the processor.

Ops may be scheduled for execution when the source operands for the ops are ready. In the illustrated embodiment, decentralized scheduling is used for each of the execution units 28 and the LSU 118, e.g., in reservation stations 116 and 110. Other embodiments may implement a centralized scheduler if desired.

The LSU 118 may be configured to execute load/store memory ops. Generally, a memory operation (memory op) may be an instruction operation that specifies an access to memory (although the memory access may be completed in a cache such as the DCache 104). A load memory operation may specify a transfer of data from a memory location to a register, while a store memory operation may specify a transfer of data from a register to a memory location. Load memory operations may be referred to as load memory ops, load ops, or loads; and store memory operations may be referred to as store memory ops, store ops, or stores. In an embodiment, store ops may be executed as a store address op and a store data op. The store address op may be defined to generate the address of the store, to probe the cache for an initial hit/miss determination, and to update the store queue with the address and cache info. Thus, the store address op may have the address operands as source operands. The store data op may be defined to deliver the store data to the store queue. Thus, the store data op may not have the address operands as source operands, but may have the store data operand as a source operand. In many cases, the address operands of a store may be available before the store data operand, and thus the address may be determined and made available earlier than the store data. In some embodiments, it may be possible for the store data op to be executed before the corresponding store address op, e.g., if the store data operand is provided before one or more of the store address operands. While store ops may be executed as store address and store data ops in some embodiments, other embodiments may not implement the store address/store data split. The remainder of this disclosure will often use store address ops (and store data ops) as an example, but implementations that do not use the store address/store data optimization are also contemplated. The address generated via execution of the store address op may be referred to as an address corresponding to the store op.

Load/store ops may be received in the reservation station 116, which may be configured to monitor the source operands of the operations to determine when they are available and then issue the operations to the load or store pipelines, respectively. Some source operands may be available when the operations are received in the reservation station 116, which may be indicated in the data received by the reservation station 116 from the MDR unit 106 for the corresponding operation. Other operands may become available via execution of operations by other execution units 112 or even via execution of earlier load ops. The operands may be gathered by the reservation station 116, or may be read from a register file 114 upon issue from the reservation station 116 as shown in FIG. 6.

In an embodiment, the reservation station 116 may be configured to issue load/store ops out of order (from their original order in the code sequence being executed by the processor 30, referred to as "program order") as the operands become available. To ensure that there is space in the LDQ 124 or the STQ 120 for older operations that are bypassed by younger operations in the reservation station 116, the MDR unit 106 may include circuitry that preallocates LDQ 124 or STQ 120 entries to operations transmitted to the load/store unit 118. If there is not an available LDQ entry for a load being processed in the MDR unit 106, the MDR unit 106 may stall dispatch of the load op and subsequent ops in program order until one or more LDQ entries become available. Similarly, if there is not a STQ entry available for a store, the MDR unit 106 may stall op dispatch until one or more STQ entries become available. In other embodiments, the reservation station 116 may issue operations in program order and LRQ 46/STQ 120 assignment may occur at issue from the reservation station 116.

The LDQ 124 may track loads from initial execution to retirement by the LSU 118. The LDQ 124 may be responsible for ensuring the memory ordering rules are not violated (between out of order executed loads, as well as between loads and stores). If a memory ordering violation is detected, the LDQ 124 may signal a redirect for the corresponding load. A redirect may cause the processor 30 to flush the load and subsequent ops in program order, and refetch the corresponding instructions. Speculative state for the load and subsequent ops may be discarded and the ops may be refetched by the fetch and decode unit 100 and reprocessed to be executed again.

When a load/store address op is issued by the reservation station 116, the LSU 118 may be configured to generate the address accessed by the load/store, and may be configured to translate the address from an effective or virtual address created from the address operands of the load/store address op to a physical address actually used to address memory. The LSU 118 may be configured to generate an access to the DCache 104. For load operations that hit in the DCache 104, data may be speculatively forwarded from the DCache 104 to the destination operand of the load operation (e.g., a register in the register file 114), unless the address hits a preceding operation in the STQ 120 (that is, an older store in program order) or the load is replayed. The data may also be forwarded to dependent ops that were speculatively scheduled and are in the execution units 112. The execution units 112 may bypass the forwarded data in place of the data output from the register file 114, in such cases. If the store data is available for forwarding on a STQ hit, data output by the STQ 120 may forwarded instead of cache data. Cache misses and STQ hits where the data cannot be forwarded may be reasons for replay and the load data may not be forwarded in those cases. The cache hit/miss status from the DCache 104 may be logged in the STQ 120 or LDQ 124 for later processing.

The LSU 118 may implement multiple load pipelines. For example, in an embodiment, three load pipelines ("pipes") may be implemented, although more or fewer pipelines may be implemented in other embodiments. Each pipeline may execute a different load, independent and in parallel with other loads. That is, the RS 116 may issue any number of loads up to the number of load pipes in the same clock cycle. The LSU 118 may also implement one or more store pipes, and in particular may implement multiple store pipes. The number of store pipes need not equal the number of load pipes, however. In an embodiment, for example, two store pipes may be used. The reservation station 116 may issue store address ops and store data ops independently and in parallel to the store pipes. The store pipes may be coupled to the STQ 120, which may be configured to hold store operations that have been executed but have not committed.

The CIF 122 may be responsible for communicating with the rest of a system including the processor 30, on behalf of the processor 30. For example, the CIF 122 may be configured to request data for DCache 104 misses and ICache 102 misses. When the data is returned, the CIF 122 may signal the cache fill to the corresponding cache. For DCache fills, the CIF 122 may also inform the LSU 118. The LDQ 124 may attempt to schedule replayed loads that are waiting on the cache fill so that the replayed loads may forward the fill data as it is provided to the DCache 104 (referred to as a fill forward operation). If the replayed load is not successfully replayed during the fill, the replayed load may subsequently be scheduled and replayed through the DCache 104 as a cache hit. The CIF 122 may also writeback modified cache lines that have been evicted by the DCache 104, merge store data for non-cacheable stores, etc. In another example, the CIF 122 can communicate interrupt-related signals for the processor 30, e.g., interrupt requests and/or acknowledgement/non-acknowledgement signals from/to a peripheral device of the system including the processor 30.

The execution units 112 may include any types of execution units in various embodiments. For example, the execution units 112 may include integer, floating point, and/or vector execution units. Integer execution units may be configured to execute integer ops. Generally, an integer op is an op which performs a defined operation (e.g., arithmetic, logical, shift/rotate, etc.) on integer operands. Integers may be numeric values in which each value corresponds to a mathematical integer. The integer execution units may include branch processing hardware to process branch ops, or there may be separate branch execution units. As described above, the execution units 112 and associated reservation stations 110 may implement one or more executions pipelines 164, 504, 506, 708, and/or 710 as described in FIGS. 1-8.

Floating point execution units may be configured to execute floating point ops. Generally, floating point ops may be ops that have been defined to operate on floating point operands. A floating point operand is an operand that is represented as a base raised to an exponent power and multiplied by a mantissa (or significand). The exponent, the sign of the operand, and the mantissa/significand may be represented explicitly in the operand and the base may be implicit (e.g., base 2, in an embodiment).

Vector execution units may be configured to execute vector ops. Vector ops may be used, e.g., to process media data (e.g., image data such as pixels, audio data, etc.). Media processing may be characterized by performing the same processing on significant amounts of data, where each datum is a relatively small value (e.g., 8 bits, or 16 bits, compared to 32 bits to 64 bits for an integer). Thus, vector ops include single instruction-multiple data (SIMD) or vector operations on an operand that represents multiple media data.

Thus, each execution unit 112 may comprise hardware configured to perform the operations defined for the ops that the particular execution unit is defined to handle. The execution units may generally be independent of each other, in the sense that each execution unit may be configured to operate on an op that was issued to that execution unit without dependence on other execution units. Viewed in another way, each execution unit may be an independent pipe for executing ops. Different execution units may have different execution latencies (e.g., different pipe lengths). Additionally, different execution units may have different latencies to the pipeline stage at which bypass occurs, and thus the clock cycles at which speculative scheduling of depend ops occurs based on a load op may vary based on the type of op and execution unit 28 that will be executing the op.

It is noted that any number and type of execution units 112 may be included in various embodiments, including embodiments having one execution unit and embodiments having multiple execution units.

A cache line may be the unit of allocation/deallocation in a cache. That is, the data within the cache line may be allocated/deallocated in the cache as a unit. Cache lines may vary in size (e.g., 32 bytes, 64 bytes, 128 bytes, or larger or smaller cache lines). Different caches may have different cache line sizes. The ICache 102 and DCache 104 may each be a cache having any desired capacity, cache line size, and configuration. There may be more additional levels of cache between the DCache 104/ICache 102 and the main memory, in various embodiments.

At various points, load/store operations are referred to as being younger or older than other load/store operations. A first operation may be younger than a second operation if the first operation is subsequent to the second operation in program order. Similarly, a first operation may be older than a second operation if the first operation precedes the second operation in program order.

Figure 10:
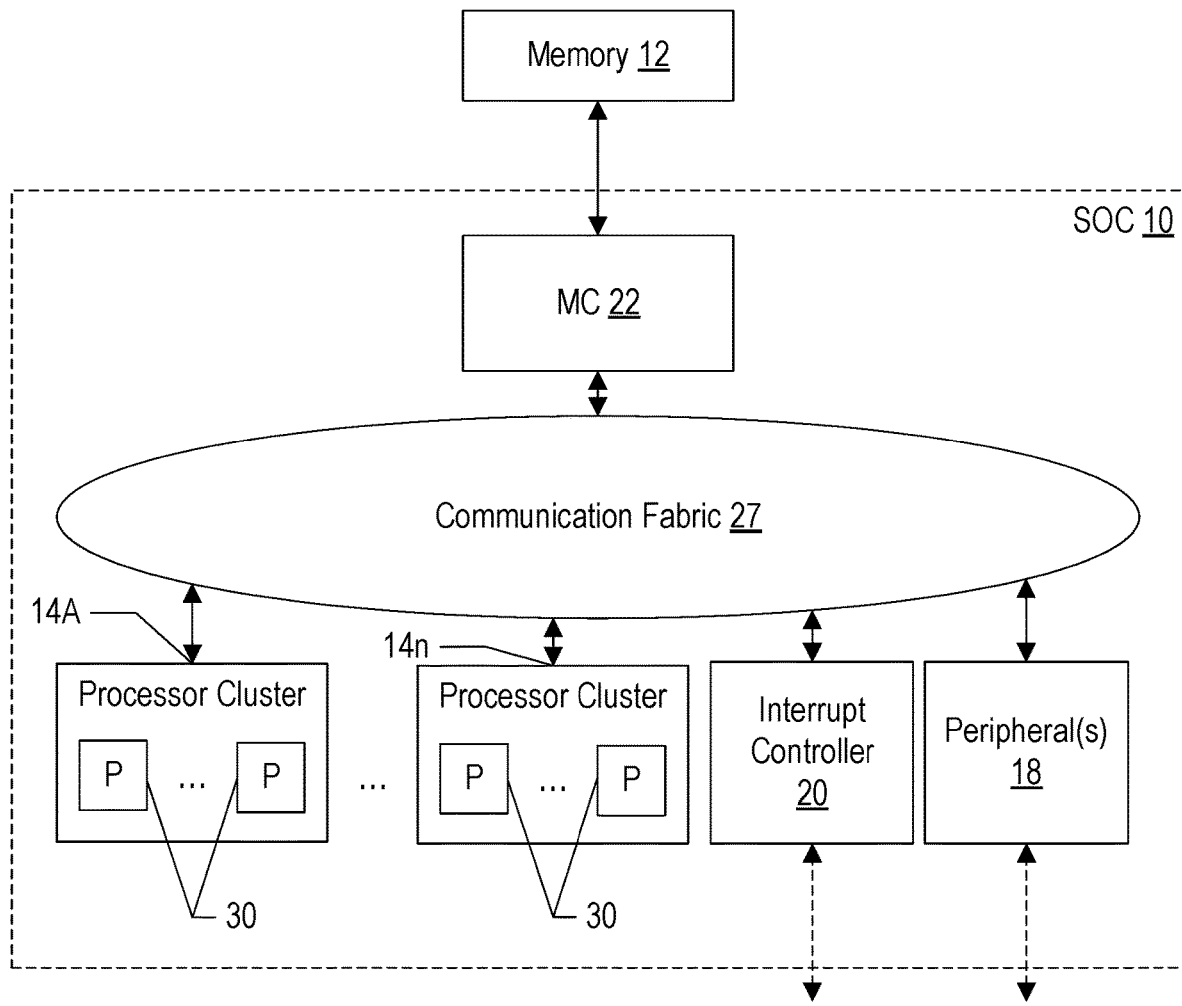
FIG. 10 is a block diagram of one embodiment of system on a chip (SOC) that may include one or more processors shown in FIG. 9.

Turning now to FIG. 10, a block diagram one embodiment of a system 10 that may include one or more processors 30. In the illustrated embodiment, the system 10 may be implemented as a system on a chip (SOC) 10 coupled to a memory 12. As implied by the name, the components of the SOC 10 may be integrated onto a single semiconductor substrate as an integrated circuit "chip." In some embodiments, the components may be implemented on two or more discrete chips in a system. However, the SOC 10 will be used as an example herein. In the illustrated embodiment, the components of the SOC 10 include a plurality of processor clusters 14A-14n, the interrupt controller 20, one or more peripheral components 18 (more briefly, "peripherals"), a memory controller 22, and a communication fabric 27. The components 14A-14n, 18, 20, and 22 may all be coupled to the communication fabric 27. The memory controller 22 may be coupled to the memory 12 during use. In some embodiments, there may be more than one memory controller coupled to corresponding memory. The memory address space may be mapped across the memory controllers in any desired fashion. In the illustrated embodiment, the processor clusters 14A-14n may include the respective plurality of processors (P) 30 and the respective processors (P) 30 may further include a respective bias prediction circuit 156, a respective instruction prediction circuit 160, and/or a respective instruction distribution circuit 502 as described in FIGS. 1-9. The processors 30 may form the central processing units (CPU(s)) of the SOC 10. In an embodiment, one or more processor clusters 14A-14n may not be used as CPUs.

As mentioned above, the processor clusters 14A-14n may include one or more processors 30 that may serve as the CPU of the SOC 10. The CPU of the system includes the processor(s) that execute the main control software of the system, such as an operating system. Generally, software executed by the CPU during use may control the other components of the system to realize the desired functionality of the system. The processors may also execute other software, such as application programs. The application programs may provide user functionality, and may rely on the operating system for lower-level device control, scheduling, memory management, etc. Accordingly, the processors may also be referred to as application processors.

Generally, a processor may include any circuitry and/or microcode configured to execute instructions defined in an instruction set architecture implemented by the processor. Processors may encompass processor cores implemented on an integrated circuit with other components as a system on a chip (SOC 10) or other levels of integration. Processors may further encompass discrete microprocessors, processor cores and/or microprocessors integrated into multichip module implementations, processors implemented as multiple integrated circuits, etc.

The memory controller 22 may generally include the circuitry for receiving memory operations from the other components of the SOC 10 and for accessing the memory 12 to complete the memory operations. The memory controller 22 may be configured to access any type of memory 12. For example, the memory 12 may be static random-access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g., LPDDR, mDDR, etc.). The memory controller 22 may include queues for memory operations, for ordering (and potentially reordering) the operations and presenting the operations to the memory 12. The memory controller 22 may further include data buffers to store write data awaiting write to memory and read data awaiting return to the source of the memory operation. In some embodiments, the memory controller 22 may include a memory cache to store recently accessed memory data. In SOC implementations, for example, the memory cache may reduce power consumption in the SOC by avoiding reaccess of data from the memory 12 to if it is expected to be accessed again soon. In some cases, the memory cache may also be referred to as a system cache, as opposed to private caches such as the L2 cache or caches in the processors, which serve only certain components. Additionally, in some embodiments, a system cache need not be located within the memory controller 22.

The peripherals 18 may be any set of additional hardware functionality included in the SOC 10. For example, the peripherals 18 may include video peripherals such as an image signal processor configured to process image capture data from a camera or other image sensor, GPUs, video encoder/decoders, scalers, rotators, blenders, display controller, etc. The peripherals may include audio peripherals such as microphones, speakers, interfaces to microphones and speakers, audio processors, digital signal processors, mixers, etc. The peripherals may include interface controllers for various interfaces external to the SOC 10 including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

The communication fabric 27 may be any communication interconnect and protocol for communicating among the components of the SOC 10. The communication fabric 27 may be bus-based, including shared bus configurations, cross bar configurations, and hierarchical buses with bridges. The communication fabric 27 may also be packet-based, and may be hierarchical with bridges, cross bar, point-to-point, or other interconnects.

It is noted that the number of components of the SOC 10 (and the number of subcomponents for those shown in FIG. 4, such as the processors 30 in each processor cluster 14A-14n may vary from embodiment to embodiment. Additionally, the number of processors 30 in one processor cluster 14A-14n may differ from the number of processors in another processor cluster 14A-14n. There may be more or fewer of each component/subcomponent than the number shown in FIG. 4.

Computer System

Figure 11:
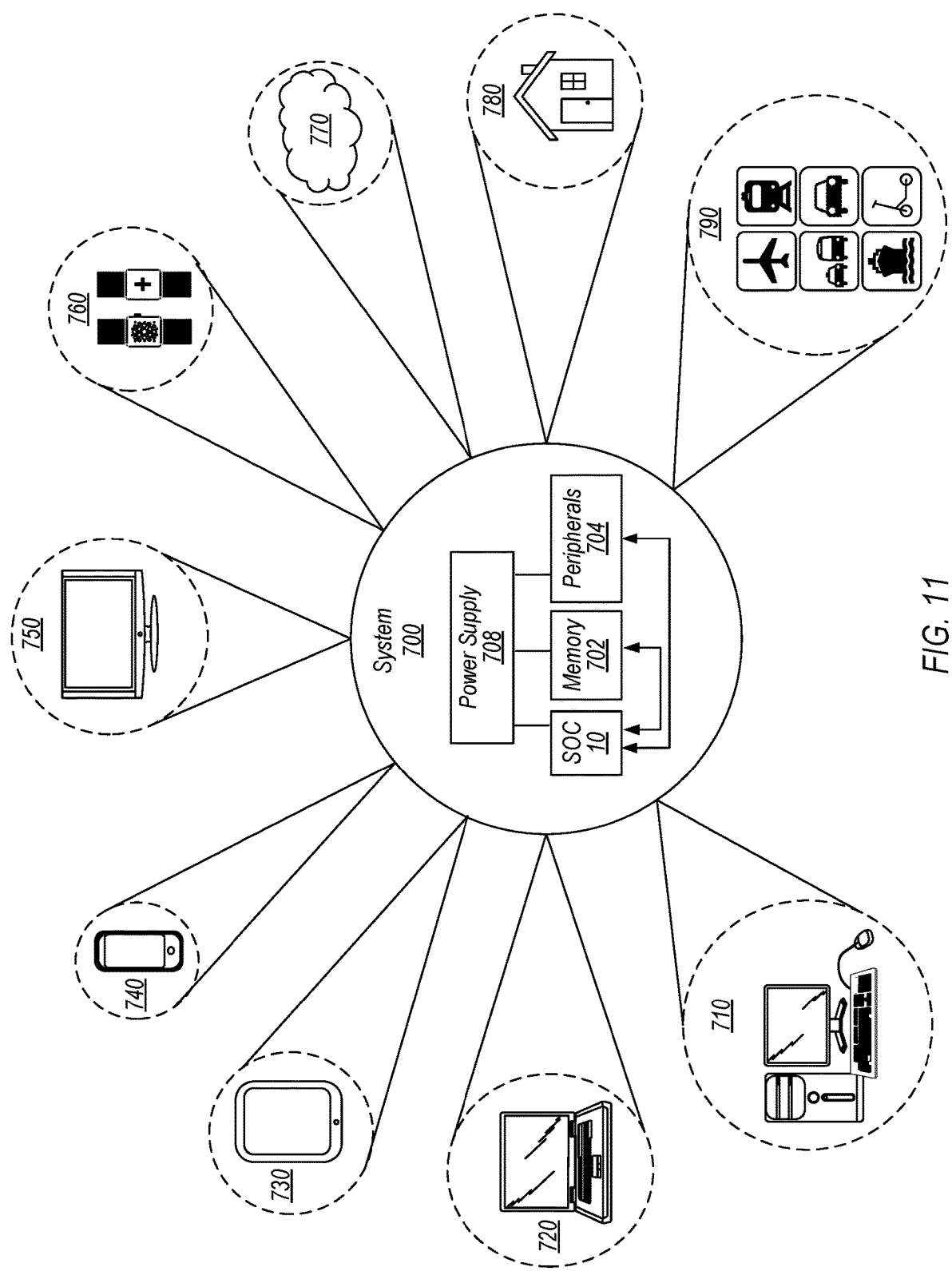
FIG. 11 is a block diagram of one embodiment of a system used in a variety of contexts.

Turning next to FIG. 11, a block diagram of one embodiment of a system 700 is shown. In the illustrated embodiment, the system 700 includes at least one instance of a system on a chip (SOC) 10 coupled to one or more peripherals 704 and an external memory 702, as described in FIG. 10. A power supply (PMU) 708 is provided which supplies the supply voltages to the SOC 10 as well as one or more supply voltages to the memory 702 and/or the peripherals 154. In some embodiments, more than one instance of the SOC 10 (e.g., the SOCs 10A-10q) may be included (and more than one memory 702 may be included as well). The memory 702 may include the memory 12 illustrated in FIGS. 1-10, in an embodiment.

The peripherals 704 may include any desired circuitry, depending on the type of system 700. For example, in one embodiment, the system 704 may be a mobile device (e.g., personal digital assistant (PDA), smart phone, etc.) and the peripherals 704 may include devices for various types of wireless communication, such as Wi-Fi, Bluetooth, cellular, global positioning system, etc. The peripherals 704 may also include additional storage, including RAM storage, solid state storage, or disk storage. The peripherals 704 may include user interface devices such as a display screen, including touch display screens or multitouch display screens, keyboard or other input devices, microphones, speakers, etc. In other embodiments, the system 700 may be any type of computing system (e.g., desktop personal computer, laptop, workstation, net top etc.).

The external memory 702 may include any type of memory. For example, the external memory 702 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g., LPDDR, mDDR, etc.), etc. The external memory 702 may include one or more memory modules to which the memory devices are mounted, such as single inline memory modules (SIMMs), dual inline memory modules (DIMMs), etc. Alternatively, the external memory 702 may include one or more memory devices that are mounted on the SOC 10 in a chip-on-chip or package-on-package implementation.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 11 is the application of system 700 to various modes of transportation. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise. These any many other embodiments are possible and are contemplated. It is noted that the devices and applications illustrated in FIG. 11 are illustrative only and are not intended to be limiting. Other devices are possible and are contemplated.

Computer Readable Storage Medium

Turning now to FIG. 12, a block diagram of one embodiment of a computer readable storage medium 800 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 800 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 800 in FIG. 12 may store a database 804 representative of the SOC 10 described above in FIG. 10. Generally, the database 804 may be a database which can be read by a program and used, directly or indirectly, to fabricate the hardware comprising the SOC 10. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the SOC 10. The netlist may then be placed and routed to produce a data set describing geometric shapes to be applied to masks. The masks may then be used in various semiconductor fabrication steps to produce a semiconductor circuit or circuits corresponding to the SOC 10. Alternatively, the database 804 on the computer accessible storage medium 800 may be the netlist (with or without the synthesis library) or the data set, as desired.

While the computer accessible storage medium 800 stores a representation of the SOC 10, other embodiments may carry a representation of any portion of the SOC 10, as desired, including any subset of the components shown in FIG. 4. The database 804 may represent any portion of the above.

\*\*\*

The present disclosure includes references to "an" embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

\*\*\*

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to." \*\*\*

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. A processor, comprising:
   a hardware instruction distribution circuit; and
   a plurality of execution pipelines including a first execution pipeline and a second execution pipeline that provide different latencies for processing mispredicted conditional instructions,
   wherein the hardware instruction distribution circuit is configured to:
      receive a first conditional instruction associated with a prediction; and
      distribute the first conditional instruction to one of the first execution pipeline and the second execution pipeline according to the prediction of the first conditional instruction for execution; and
   wherein the first execution pipeline is configured to:
      in response to receiving the first conditional instruction, execute the first conditional instruction;
         determine that the prediction of the first conditional instruction is a misprediction; and
         in response to determining that the prediction of the first conditional instruction is a misprediction, cause the first conditional instruction to be executed in the second execution pipeline.

2. The processor of claim 1, wherein the second execution pipeline is configured to:
   execute the first conditional instruction;
   determine that the prediction of the first conditional instruction is a misprediction; and
   in response to determining that the prediction of the first conditional instruction is a misprediction, cause an instruction to be obtained from a target address of the first conditional instruction for execution.

3. The processor of claim 1, wherein the prediction of the first conditional instruction is associated with a confidence level with respect to one or more criteria, and wherein the one or more criteria include at least one of (a) that the prediction is provided by a bias prediction circuit using a bias table or (b) that the prediction is provided by an instruction prediction circuit using one or more tables based at least in part on prediction history of conditional instructions.

4. The processor of claim 3, wherein hardware instruction distribution circuit is configured to distribute the first conditional instruction to the first execution pipeline for execution when the prediction of the first conditional instruction is associated with a high confidence level, or to the second execution pipeline for execution when the prediction of the first conditional instruction is associated with a low confidence level.

5. The processor of claim 3, further comprising:
   a third execution pipeline configured to:
      execute a second conditional instruction associated with a prediction of a high confidence level; and
      determine that the prediction of the second conditional instruction is a misprediction; and
   a first misprediction selection circuit configured to:
      prior to the first conditional instruction being caused to be executed in the second execution pipeline, compare an age of the first conditional instruction from the first execution pipeline and an age of the second conditional instruction from the third execution pipeline; and
      in response to determining that the first conditional instruction is older than the second conditional instruction, cause the first conditional instruction to be executed in the second execution pipeline.

6. The processor of claim 3, further comprising:
   a fourth execution pipeline configured to:
      execute a third conditional instruction associated with a prediction of a low confidence level; and
      determine that the prediction of the third conditional instruction is a misprediction; and
   a second misprediction selection circuit configured to:
      compare an age of the first conditional instruction from the second execution pipeline and an age of the third conditional instruction from the fourth execution pipeline; and
      cause an instruction to be obtained from a target address of an older one of the first and third conditional instructions for execution.

7. The processor of claim 1, wherein the second execution pipeline provides a less latency than the first execution pipeline for processing the mispredicted conditional instructions, and wherein to provide the less latency, the second execution pipeline is configured to, in response to determining that the prediction of the first conditional instruction is a misprediction, directly instruct another circuit of the processor to obtain an instruction from a target address of the first conditional instruction for execution.

8. The processor of claim 1, wherein the second execution pipeline provides a less latency than the first execution pipeline for processing the mispredicted conditional instructions, and wherein the second execution pipeline includes a less number of stages than the first execution pipeline.

9. The processor of claim 1, wherein to cause the first conditional instruction to be executed in the second execution pipeline, the first execution pipeline is configured to:
   create a bubble in the second execution pipeline; and
   cause the first conditional instruction to be inserted into the bubble for the first conditional instruction to be executed by the second execution pipeline.

10. The processor of claim 9, wherein the second execution pipeline is configured to:

execute a non-conditional instruction in a same cycle as the first conditional instruction.

11. A method, comprising:
receiving, at an instruction distribution circuit of a processor, a first conditional instruction associated with a prediction;
distributing, using the instruction distribution circuit, the first conditional instruction to one of a plurality of execution pipelines of the processor according to the prediction of the first conditional instruction for execution, wherein the plurality of execution pipelines include a first execution pipeline and a second execution pipeline that provide different latencies for processing mispredicted conditional instructions;
executing, using the first execution pipeline, the first conditional instruction;
determining, using the first execution pipeline, that the prediction of the first conditional instruction is a misprediction; and
in response to determining that the prediction of the first conditional instruction is a misprediction, causing the first conditional instruction to be executed in the second execution pipeline.

12. The method of claim 11, further comprising:
causing, using the second execution pipeline, an instruction to be obtained from a target address of the first conditional instruction for execution.

13. The method of claim 11, wherein the prediction of the first conditional instruction is associated with a confidence level with respect to one or more criteria, and wherein the one or more criteria include at least one of (a) that the prediction is provided by a bias prediction circuit using a bias table or (b) that the prediction is provided by an instruction prediction circuit using one or more tables based at least in part on prediction history of conditional instructions.

14. The method of claim 13, further comprising:
distributing the first conditional instruction to the first execution pipeline for execution when the prediction of the first conditional instruction satisfies the one or more criteria, or to the second execution pipeline for execution when the prediction of the first conditional instruction fails to satisfy the one or more criteria.

15. The method of claim 13, further comprising:
executing, using a third execution pipeline, a second conditional instruction associated with a prediction that satisfies the one or more criteria; and
determining that the prediction of the second conditional instruction is a misprediction,
wherein causing the first conditional instruction to be executed in the second execution pipeline further comprises:
comparing, using a first misprediction selection circuit, an age of the first conditional instruction and an age of the second conditional instruction; and
in response to determining that the first conditional instruction is older than the second conditional instruction, causing the first conditional instruction to be executed in the second execution pipeline.

16. The method of claim 13, further comprising:
executing, using a fourth execution pipeline, a third conditional instruction associated with a prediction that fails to satisfy the one or more criteria;
determining that the prediction of the third conditional instruction is a misprediction;
comparing, using a second misprediction selection circuit, an age of the first conditional instruction and an age of the third conditional instruction; and
causing an instruction to be obtained from a target address of an older one of the first and third conditional instructions for execution.

17. The method of claim 13, further comprising:
receiving, at the instruction distribution circuit, a fourth conditional instruction associated with a prediction that satisfies the one or more criteria; and
distributing the fourth conditional instruction to the second execution pipeline for execution based on occupancy of the second execution pipeline.

18. The method of claim 11, wherein the second execution pipeline provides a less latency than the first execution pipeline for processing the mispredicted conditional instructions, and wherein the second execution pipeline has a communication path to directly instruct an instruction to be obtained from a target address for execution in response to determining that the prediction of the first conditional instruction is a misprediction.

19. A system, comprising:
one or more processors, wherein an individual one of the one or more processors comprises:
a hardware instruction distribution circuit; and
a plurality of execution pipelines including a first execution pipeline and a second execution pipeline that provide different latencies for processing mispredicted conditional instructions,
wherein the hardware instruction distribution circuit is configured to:
receive a first conditional instruction associated with a prediction; and
select one of the first execution pipeline and the second execution pipeline according to the prediction of the first conditional instruction for executing the first conditional instruction; and
wherein the first execution pipeline is configured to:
in response to receiving the first conditional instruction, execute the first conditional instruction;
determine that the prediction of the first conditional instruction is a misprediction; and
in response to determining that the prediction of the first conditional instruction is a misprediction, cause the first conditional instruction to be executed in the second execution pipeline.

20. The system of claim 19, wherein the second execution pipeline is configured to:
execute the first conditional instruction;
determine that the prediction of the first conditional instruction is a misprediction; and
in response to determining that the prediction of the first conditional instruction is a misprediction, cause an instruction to be obtained from a target address of the first conditional instruction for execution.

* * * * *